US 9,087,333 B2

(12) United States Patent
Kim et al.

(10) Patent No.: US 9,087,333 B2
(45) Date of Patent: Jul. 21, 2015

(54) METHOD AND SYSTEM FOR MONITORING QUALITY OF FOOD

(75) Inventors: Byeong Sam Kim, Seongnam-si (KR); Ji Young Kim, Seoul (KR); Jong Hoon Kim, Seoul (KR); Ouiwoung Kim, Hwaseong-si (KR); Ki Hyun Kwon, Suwon-si (KR); Yong Kon Park, Suwon-si (KR); Yoon Sook Kim, Seoul (KR); Junemo Koo, Seongnam-si (KR)

(73) Assignee: Korea Food Research Institute, Seongnam-si, Gyeonggi-do (KR)

( * ) Notice: Subject to any disclaimer, the term of this patent is extended or adjusted under 35 U.S.C. 154(b) by 348 days.

(21) Appl. No.: 13/877,612

(22) PCT Filed: Oct. 6, 2011

(86) PCT No.: PCT/KR2011/007392
§ 371 (c)(1),
(2), (4) Date: May 7, 2013

(87) PCT Pub. No.: WO2012/047031
PCT Pub. Date: Apr. 12, 2012

(65) Prior Publication Data
US 2013/0214938 A1    Aug. 22, 2013

(30) Foreign Application Priority Data

Oct. 6, 2010    (KR) .................. 10-2010-0097445
Nov. 29, 2010   (KR) .................. 10-2010-0120000

(51) Int. Cl.
*C08C 19/22*     (2006.01)
*G06Q 30/00*     (2012.01)
(Continued)

(52) U.S. Cl.
CPC ............ *G06Q 30/00* (2013.01); *G06Q 10/0832* (2013.01); *G06K 2017/0077* (2013.01)

(58) Field of Classification Search
USPC ..................... 340/870.07, 870.16, 540, 10.1
See application file for complete search history.

(56) References Cited

U.S. PATENT DOCUMENTS 6,445,976 B1 *   9/2002   Ostro ............................ 700/226
6,874,000 B2 *   3/2005   Sholl et al. ........................ 1/1
(Continued)

FOREIGN PATENT DOCUMENTS

JP    2005-208828    8/2005    ............. G06F 17/60
JP    2007-034683    2/2007    ............. G06K 19/07
(Continued)

OTHER PUBLICATIONS

European Patent Office, European Search Report—European Patent Application No. 11830916, dated Mar. 27, 2014, 10 pages.

*Primary Examiner* — Jennifer Mehmood
*Assistant Examiner* — Rufus Point
(74) *Attorney, Agent, or Firm* — Sunstein Kann Murphy & Timbers LLP

(57) ABSTRACT

Disclosed is a method of monitoring food quality including (a) receiving an environmental factor value sensed during transporting by a moving sensor tag attached to a container or palette on which a plurality of food is stacked, a time value sensing the environmental factor, and food information from a distribution company server; (b) receiving an environmental factor value sensed by a fixed sale sensor tag which matches the food information stored in the moving sensor tag, a time value sensing the environmental factor, and food information from the distribution company server; (c) measuring a current quality index for each individual quality analysis item and a total quality index based on the food information sensed by the moving sensor tag and the fixed sale sensor tag, the environmental factor values, and the time values sensing the environmental factors; (d) setting price of the food based on the measured quality index for each individual quality analysis item and total quality index; and (e) transmitting bar code information or electronic tag information (food information) corresponding to a plurality of food which matches inherent IDs of the fixed sale sensor tags, the quality index for each individual analysis item of the food, the total quality index, and the price of the food to the distribution company server.

9 Claims, 19 Drawing Sheets

(51) Int. Cl.
*G06Q 10/08* (2012.01)
*G06K 17/00* (2006.01)

(56) References Cited

U.S. PATENT DOCUMENTS

| | | | |
|---|---|---|---|
| 7,096,221 B2* | 8/2006 | Nakano | 340/6.1 |
| 7,149,658 B2* | 12/2006 | Kadaba | 702/184 |
| 7,299,068 B1* | 11/2007 | Halla et al. | 455/561 |
| 7,392,150 B2* | 6/2008 | Kuepper et al. | 702/130 |
| 7,495,558 B2* | 2/2009 | Pope et al. | 340/572.1 |
| 7,937,244 B2* | 5/2011 | Kadaba | 702/184 |
| 8,542,023 B2* | 9/2013 | Potyrailo et al. | 324/652 |
| 2002/0161545 A1* | 10/2002 | Starling et al. | 702/130 |
| 2002/0189267 A1* | 12/2002 | Singh et al. | 62/126 |
| 2003/0146836 A1* | 8/2003 | Wood | 340/540 |
| 2003/0152679 A1* | 8/2003 | Garwood | 426/392 |
| 2004/0046644 A1* | 3/2004 | Bauhahn | 340/10.42 |
| 2004/0236191 A1 | 11/2004 | Poliska et al. | 600/300 |
| 2005/0140509 A1 | 6/2005 | Miyazawa | 340/539.27 |
| 2005/0150952 A1* | 7/2005 | Chung | 235/385 |
| 2005/0248455 A1 | 11/2005 | Pope et al. | 340/539.27 |
| 2005/0267790 A1* | 12/2005 | Skalsky | 705/7 |
| 2006/0006987 A1* | 1/2006 | Hashimoto et al. | 340/10.51 |
| 2006/0213989 A1* | 9/2006 | Ahmadi et al. | 235/440 |
| 2006/0220789 A1* | 10/2006 | Suzuki et al. | 340/10.1 |
| 2006/0261946 A1 | 11/2006 | Himberger et al. | 340/572.1 |
| 2007/0109121 A1* | 5/2007 | Cohen | 340/539.26 |
| 2007/0254080 A1* | 11/2007 | Schackmuth et al. | 426/523 |
| 2008/0103723 A1* | 5/2008 | Burdett et al. | 702/130 |
| 2008/0144697 A1* | 6/2008 | Stewart et al. | 374/141 |
| 2008/0294488 A1* | 11/2008 | Gupta et al. | 705/8 |
| 2009/0146806 A1* | 6/2009 | Jensen et al. | 340/540 |
| 2009/0271243 A1* | 10/2009 | Sholl et al. | 705/9 |
| 2010/0076872 A1 | 3/2010 | Nakamura | 705/28 |
| 2011/0035326 A1* | 2/2011 | Sholl et al. | 705/317 |
| 2012/0107191 A1* | 5/2012 | Strahle et al. | 422/401 |

FOREIGN PATENT DOCUMENTS

| | | | |
|---|---|---|---|
| KR | 10-2003-036537 | 5/2003 | G06F 17/60 |
| KR | 10-2003-0036537 | 5/2003 | G06F 17/60 |
| KR | 10-2009-0059616 | 6/2009 | H04B 5/02 |
| WO | WO 03/052354 A1 | 6/2003 | G01D 9/00 |
| WO | WO 2012/047031 A2 | 4/2012 | G06K 9/18 |
| WO | WO 2012/047031 A3 | 4/2012 | G06Q 10/00 |

* cited by examiner

FIG. 7
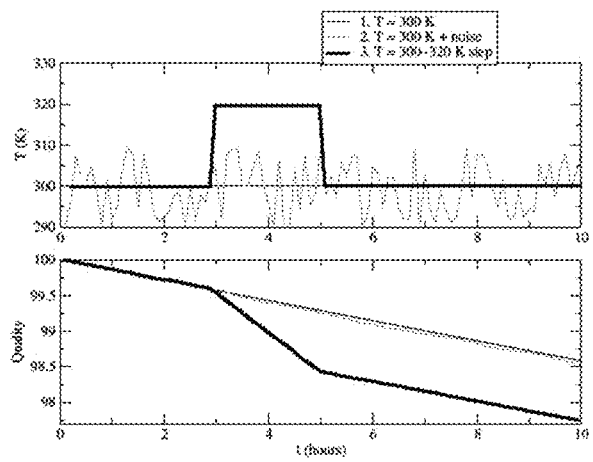
FIG. 8
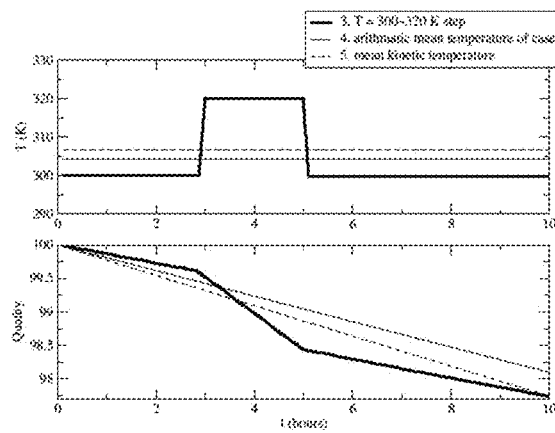
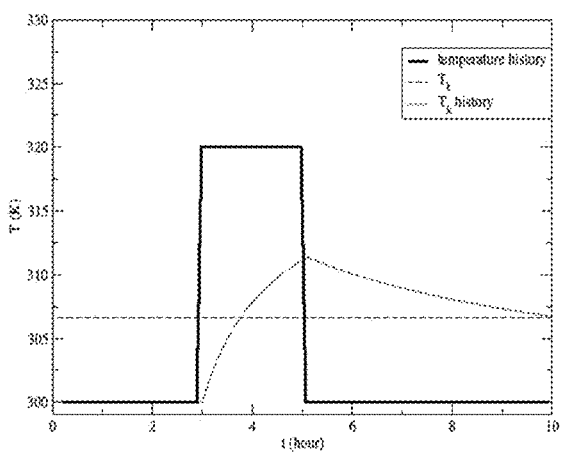

ns. KR10-2010-0097445 filed Oct. 6, 2010 and KR10-2010-0120000 filed Nov. 29, 2010, the entire contents of which are incorporated herein by reference.

BACKGROUND OF THE INVENTION

1. Field of the Invention

The present invention relates to a method and a system for monitoring food quality, and more particularly to a method and a system for monitoring food quality which attach a sensor tag for detecting a change in an environment where a plurality of food is stacked in a container or on a palette, sense the change in the environment generated during transporting or sales of the food by using the sensor tag in real time, and evaluate food quality information in real time so as to provide the evaluated food quality information to a consumer.

2. Description of the Prior Art

Currently, traceability is introduced to food, which corresponds to a system providing information such as a product name of the food, a production area, and a production date to consumers, and such information on the food is recorded by a bar code or a register and then the bar code or register is provided.

However, the traceability of the food has a limitation in showing a lot of information through the bar code or register. Accordingly, a method of providing all histories generated during production, transporting, and distribution processes by using a radio frequency identification technique such as an RFID tag is currently used.

In order to solve the above-mentioned problems, a technology of monitoring a state change generated during the transporting process of the food by using the RFID tag or a sensor tag is developed. However, the technology displays an expiration date and price corresponding to the most important factors of the food which are determined according to a food state when the food is shipped only on an outer surface of the package without evaluating food quality in real time. Accordingly, there is a problem in that an expiration date and price reflecting a quality index of the food or an actual quality worth of the food according to a change in a transporting environment of the food cannot be provided to the consumers.

Further, there is a problem in that a quality index of the food or an actual quality worth of the food according to a change in a transporting environment cannot be accurately obtained since a sensing time of the sensor tag cannot be adjusted according to an environment change generated during the transporting process of the food.

Moreover, there is a problem in that an individual quality analysis item is set according to a characteristic and a nutritional content of the food and a state of the food is evaluated according to the individual quality analysis item of the food, so that a quality index of the nutritional content remaining in the food or the remainder of the expiration date according to an environment change generated during the transporting and distribution processes of the food cannot be provided to the consumers.

In order to solve the above problems, a food quality monitoring method should be developed.

A conventional food quality monitoring method attaches a sensor tag to a container or palette on which a plurality of food is stacked, senses a change in an environmental factor generated during a transporting process in real time by using a sensor tag, and monitors a quality change in the food so as to manage food quality and determine a price of the food according to the quality change in the food, thereby reducing food in stock and increasing efficiency in operation.

However, according to a general food distribution process, the food is moved from a production area to a distribution company and then to a retail store.

The conventional food monitoring method can be used in the distribution process between the production area and the distribution company.

That is, since products are distributed in the unit of containers or palettes on which a plurality of food is stacked from the production area to the distribution company, it is possible to sense the change in the environmental factor generated during the transporting process in real time by using a sensor tag attached in the unit of containers or palettes.

However, the products provided in the unit of palettes from the distribution company to the retail store are sold by the piece to the consumers.

Accordingly, by selling the products distributed in the unit of palettes by the piece, the monitoring of the food sold by the piece is difficult.

SUMMARY OF THE INVENTION

The present invention has been made to solve the above mentioned problems, and an aspect of the present invention is to reduce food in stock and increase efficiency in operation by attaching a sensor tag to a container or palette on which a plurality of food is stacked, sensing a change in an environmental factor generated during a transporting process in real time by using a sensor tag, and monitoring a quality change in the food so as to manage food quality and determine a price of the food according to the quality change in the food, thereby reducing food in stock and increasing efficiency in operation.

Further, another aspect of the present invention is to accurately obtain a quality index of the food according to an environmental change generated during a transporting process by adjusting a sensing time of a sensor tag attached to a container or palette according to a change in an environmental factor.

Moreover, another aspect of the present invention is to provide detailed information according to a characteristic and a nutritional content of the food to consumers by setting an individual quality analysis item according to characteristic and the nutritive component of the food and setting a quality index for each individual quality analysis item.

The present invention provides a reduction of products in stock and efficiency in operation by monitoring a quality change in the products sold by piece after distribution in the unit of containers or palettes, managing quality, and determining a price of the products. In accordance with an aspect of the present invention, a method of monitoring food quality is provided. The method includes, performed by a food quality monitoring server, (a) receiving an environmental factor value sensed during transporting by a sensor tag attached to a container or palette on which a plurality of food is stacked, a time value sensing the environmental factor, and product information from a distribution company server; (b) measuring a current quality index for each individual quality analysis item of the food and a total quality index based on the received product information, environmental factor value, and time value; (c) setting a price of the food based on the measured quality index for each individual quality analysis item of the food and total quality index; and (d) transmitting a plurality of bar code information or electronic tag information corresponding to the plurality of food stacked in the container or palette, the quality index for each individual quality analysis item of the food, the total quality index, and the price of the food to the distribution company server.

In accordance with another aspect of the present invention, a method of monitoring food quality is provided. The method includes, performed by a distribution company server, (a) receiving an environmental factor value sensed during transporting of food by a sensor tag, a time value sensing the environmental factor value, and product information on the food from a sensor tag reader; (b) transmitting the received product information, environmental factor value, and time value to a food quality monitoring server; (c) receiving a quality index for each individual quality analysis item of the food, a total quality index, and price of the food measured based on the product information, the environmental factor value, and the time value from the food quality monitoring server together with a plurality of bar code information or electronic tag information corresponding to a plurality of food stacked in a container or palette to which the sensor tag is attached and then storing them; and (d) when receiving bar code information or electronic tag information of the food from a food information reading device, identifying a quality index for each individual quality analysis item of the food corresponding to the received bar code information or electronic tag information, a total quality index, and a price of the food and transmitting them to the food information reading device.

In accordance with another aspect of the present invention, a method of monitoring food quality is provided. The method includes, performed by a food information reading device, (a) when detecting a bar code or electronic tag attached to food within a predetermined range, reading the bar code or electronic tag to extract bar code information or electronic tag information; (b) transmitting the extracted bar code information or electronic tag information to a distribution company server; and (d) receiving a quality index for each individual quality analysis item of the food corresponding to the bar code information or electronic tag information, a total quality index, and price of the food from the distribution company server and displaying them.

In accordance with another aspect of the present invention, a method of monitoring food quality is provided. The method includes (a) when receiving an environmental factor value sensed during transporting by a sensor tag attached to a container or palette on which a plurality of food is stacked, a time value sensing the environmental factor, and product information on food from a sensor tag reader, transmitting them to a food quality monitoring server, by a distribution company server; (b) measuring a quality index for each individual quality analysis item of the food and a total quality index based on the received product information, environmental factor value, and time value, by the food quality monitoring server; (c) setting a price of the food based on the measured quality index for each individual quality analysis item of the food and total quality index, by the food quality monitoring server; (d) transmitting the measured quality index for each individual quality analysis item of the food and total quality index, and the set price of the food to the distribution company server together with a plurality of bar code information or electronic tag information corresponding to a plurality of food stacked in the container or palette, by the food quality monitoring server; (e) transmitting bar code information or electronic tag information extracted by reading a bar code or electronic tag of the food detected within a predetermined range to the distribution company server, by a food information reading device; (f) identifying a quality index for each individual quality analysis item corresponding to the bar code information or electronic tag information received in (e), a total quality index, and a price of the food based on the plurality of bar code information or electronic tag information received in (d) and transmitting them to the food information reading device, by the distribution company server; and (g) displaying the quality index for each individual quality analysis item, the total quality index, and the price of the food received from the distribution company server, by the food information reading device.

In accordance with another aspect of the present invention, a method of monitoring food quality is provided. The method includes (a) sensing an environmental factor at preset time intervals during transporting of food, by a sensor tag attached to a container or palette on which a plurality of food is stacked; (b) storing the sensed environmental factor value and a time value sensing the environmental factor; (c) when the sensed environmental factor value is not included in a preset environmental factor value range of the food, adjusting a time interval at which the environmental factor is sensed to sense and store the environmental factor; and (d) transmitting the stored environmental factor value and time value sensing the environmental factor during the transporting of the food to a sensor tag reader.

In accordance with another aspect of the present invention, a method of monitoring food quality is provided. The method includes, performed by a food quality monitoring server, (a) receiving an environmental factor value sensed during transporting by a moving sensor tag attached to a container or palette on which a plurality of food is stacked, a time value sensing the environmental factor, and food information from a distribution company server; (b) receiving an environmental factor value sensed by a fixed sale sensor tag which matches the food information stored in the moving sensor tag, a time value sensing the environmental factor, and food information from the distribution company server; (c) measuring a current quality index for each individual quality analysis item and a total quality index based on the food information sensed by the moving sensor tag and the fixed sale sensor tag, the environmental factor values, and the time values sensing the environmental factors; (d) setting price of the food based on the measured quality index for each individual quality analysis item and total quality index; and (e) transmitting bar code information or electronic tag information (food information) corresponding to a plurality of food which matches inherent IDs of the fixed sale sensor tags, the quality index for each individual analysis item of the food, the total quality index, and the price of the food to the distribution company server.

In accordance with another aspect of the present invention, a method of monitoring food quality is provided.

The method includes, performed by a distribution company server, (a) receiving an environmental factor value sensed during transporting or sale of the food by a moving sensor tag, a time value sensing the environmental factor value, and product information on the food from a sensor tag reader; (b) matching the product information on the food transmitted from the moving sensor tag with inherent IDs of fixed sale sensor tags; (c) receiving an environmental factor value sensed during storage of the food by the fixed sale sensor tag, a time value sensing the environmental factor value, and product information on the food from the sensor tag reader; (d) transmitting the product information, the environmental factor values, and the time value received from the moving sensor tag and the fixed sale sensor tag to a food quality monitoring server; (e) receiving a quality index for each quality analysis item of the food, total quality index, and price of the food measured based on the product information, the environmental factor values, and the time values from the food quality monitoring server together with a plurality of bar code information or electronic tag information (food information) corresponding to the food and storing them; and (f) when receiving bar code information or electronic tag information of the food from a food information reading device, identifying a quality index for each individual quality analysis item of the food corresponding to the received bar code information or electronic tag information, a total quality index, and a price of the food and transmitting them to the food information reading device.

In accordance with another aspect of the present invention, a method of monitoring food quality is provided. The method includes (a) transmitting an environmental factor value sensed during transporting by a moving sensor tag attached to a container or palette on which a plurality of food is stacked from a sensor tag reader, a time value sensing the environmental factor, and product information on the food to a food quality monitoring server, by a distribution company server; (b) receiving the environmental factor value sensed from the sensor tag reader by a fixed sale sensor tag attached to a counter, a time value sensing the environmental factor, and stored product information on the food and transmitting them to the food quality monitoring server, by the distribution company server; (c) measuring a quality index for each individual quality analysis item of the food and a total quality index based on the received product information, environmental factor values, and time values, by the food quality monitoring server; (d) setting a price of the food based on the measured quality index for each individual quality analysis item of the food and total quality index, by the food quality monitoring server; (e) transmitting the measured quality index for each individual quality analysis item of the food, total quality index, and price of the food to the distribution company server together with a plurality of bar code information or electronic tag information corresponding to a plurality of food which matches the fixed sale sensor tags, by the food quality monitoring server; (f) transmitting bar code information or electronic tag information extracted by reading a bar code or electronic tag of the food detected within a predetermined range to the distribution company server, by a food information reading device; (g) identifying a quality index for each individual quality analysis item corresponding to the bar code information or electronic tag information received in (f), a total quality index, and a price of the food based on the plurality of bar code information or electronic tag information received in (e) and transmitting them to the food information reading device, by the distribution company server; and (h) displaying the quality index for each individual quality analysis item of the food, total quality index, and price of the food received from the distribution company server, by the food information reading device.

In accordance with another aspect of the present invention, a system for monitoring food quality is provided. The system includes a plurality of moving sensor tags for sensing an environmental factor value and a time value sensing the environmental factor and storing information on food stacked in a container or palette during transporting of the food, the plurality of moving sensor tags being attached to the container or palette on which a plurality of food is stacked; a plurality of fixed sale sensor tags for sensing an environment value attached to and stored in a counter and a time value sensing the environmental factor and storing information on the food stored in the counter; a sensor tag reader for reading the environmental factor values sensed by the moving sensor tag and the fixed sale sensor tag, the time values sensing the environmental factors, and the stored food information and transmits them; a distribution company server for matching the product information stored in the moving sensor tag and the fixed sale sensor tag and transmitting the environmental factor values, time values sensing the environmental factors, and food information transmitted through the sensor tag reader; and a food quality monitoring server for measuring a current quality index for each individual quality analysis item of the food and a total quality index based on the food information sensed through the moving sensor tag and the fixed sale sensor tag, the environmental factor values, and the time values, setting a price of the food based on the measured quality index for each individual quality analysis item and total quality index, and transmitting bar code information or electronic tag information corresponding to a plurality of food which matches the fixed sensor tags, the quality index for each individual quality analysis item of the food, the total quality index, and the price of the food to the distribution company server.

The present invention has an effect of reducing food in stock and increasing efficiency in operation by attaching a sensor tag to a container or palette on which a plurality of food is stacked, sensing a change in an environmental factor generated during a transporting process in real time by using a sensor tag, and monitoring a quality change in the food so as to manage food quality and determine a price of the food according to the quality change in the food, thereby reducing food in stock and increasing efficiency in operation.

Further, the present invention has an effect of accurately obtaining a quality index of the food according to an environment change generated during a transporting process by adjusting a sensing time of a sensor tag attached to a container or palette according to a change in an environmental factor.

Moreover, the present invention has an effect of providing detailed information according to a characteristic and a nutritive component of the food to consumers by setting an individual quality analysis item according to characteristic and the nutritive component of the food and setting a quality index for each individual quality analysis item.

The present invention has an effect of reducing products in stock and increasing efficiency in operation by monitoring a quality change in the products sold by piece after distribution in the unit of containers or palettes, managing quality, and determining a price of the products.

BRIEF DESCRIPTION OF THE DRAWINGS

FIG. 7 is a diagram illustrating an Arrhenius equation for calculating a quality index according to an embodiment of the present invention;

FIG. 8 is a diagram illustrating quality index prediction by MKT and an Arrhenius equation for calculating a quality index according to an embodiment of the present invention;

DETAILED DESCRIPTION OF THE EXEMPLARY EMBODIMENTS

Hereinafter, exemplary embodiments of the present invention will be described with reference to the accompanying drawings to describe the embodiments in detail so that the present invention can be easily implemented by those skilled in the art.

Figure 1:
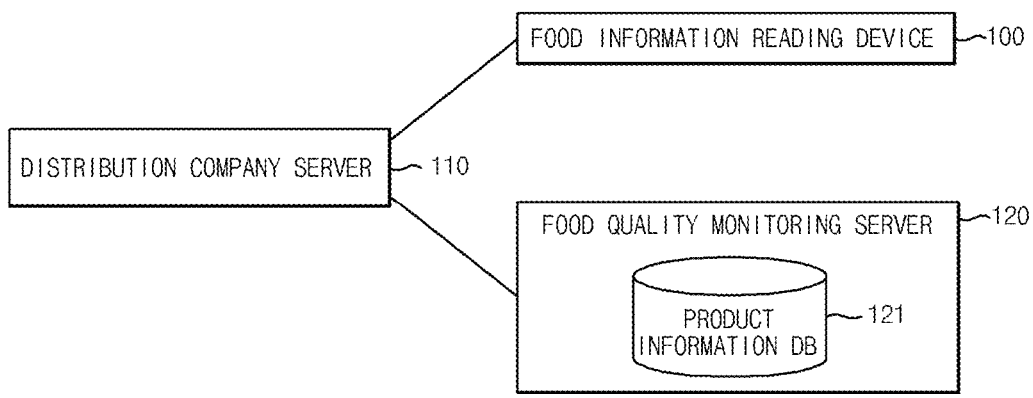
FIG. 1 is a diagram illustrating a configuration of a food quality monitoring system according to an embodiment of the present invention.

FIG. 1 is a diagram illustrating a configuration of a food quality monitoring system according to an embodiment of the present invention.

A food information reading device 100 reads a bar code attached to food and transmits information on the read bar code to a distribution company server 110. Further, when receiving the bar code information and quality information on the food from the distribution company server 110, the food information reading device 100 displays the received bar code information and quality information on a screen.

At this time, the food information reading device 100 may be at least one of a fixedly installed kiosk, a smart phone, and a portable reading device for reading the bar code and displaying the bar code information received from the distribution company server 110.

Here, the bar code information on the bar code attached to the food contains national information, manufacturer information, a product name, and a group ID.

Further, instead of the bar code, an electronic tag may be attached to the food. When the electronic tag is attached to the food, information the same as the bar code information is registered in electronic tag information.

The following detailed description will be made based on the assumption that the bar code is attached to the food.

The distribution company server 110 includes a sensor tag reader for reading a sensor tag, and reads the sensor tag attached to a container or palette on which the food is stacked by the sensor tag reader to receive an inherent ID of the extracted sensor tag, a product name, initial quality information on the food, an environmental factor value sensed during the transporting process, and a time value at which the environmental factor is sensed.

At this time, the initial quality information on the food contains a quality index for each individual quality analysis item and a total quality index when the food is shipped, and an expiration date and price information according to the quality indexes.

Further, the distribution company server 110 transmits the inherent ID of the sensor tag of the food stacked in the container or palette, the product name, the initial quality information on the food, the environmental factor value sensed during the transporting process, and the time value to a food quality monitoring server 120.

When receiving the bar code information and quality information on the food stacked in the container or palette from the food quality monitoring server 120, the distribution company server 110 matches the received bar code information and quality information and stores the matched quality information.

At this time, the quality information contains a quality index of the food for each individual quality analysis item of the food, a total quality index, an expiration data, and price information.

The individual quality analysis item corresponds to nutritional contents (nutritional content value) for each nutritional content contained in the food, and the individual quality analysis item is changeable according to a characteristic and nutritive component of the food.

The food quality monitoring server 120 matches inherent IDs of the sensor tags attached to the container or palette and a plurality of bar code information attached to the food stacked in the container or palette and stores the matched inherent IDs and bar code information, and includes a database for storing a standard quality index according to the individual quality analysis item of the food and a standard total quality index for each food.

When receiving the inherent ID of the sensor tag attached to the container or palette on which the food is stacked, the product name, the initial quality information on the food, the environmental factor value, and the detected time value from the distribution company server 110, the food quality monitoring server 120 calculates a current quality index for each individual quality analysis item and the total quality index of the food by using the initial quality information on the food, the environmental factor value, and the detected time value.

Further, the food quality monitoring server 120 sets an expiration date and a price of the food based on the quality index for each individual quality analysis item and the total quality index according to a current state of the food, matches the quality information containing the quality index for each quality analysis item of the food, the total quality index, the expiration date, and a proper price with the inherent ID of the sensor tag, and transmits the matched quality information and inherent ID to the distribution company server 110 together with the plurality of pieces of stored bar code information.

Figure 2:
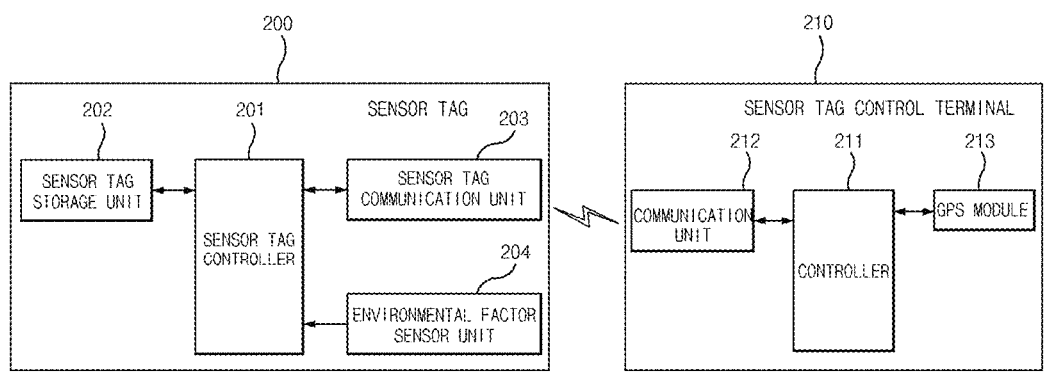
FIG. 2 is a diagram illustrating internal configurations of a sensor tag and a sensor tag control terminal according to an embodiment of the present invention.

FIG. 2 is a diagram illustrating external configurations of a sensor tag and a sensor tag control terminal according to an embodiment of the present invention.

The sensor tag 200 includes a sensor tag controller 201, a sensor tag storage unit 202, a sensor tag communication unit 203, and an environmental factor sensor unit 204.

The environmental factor sensor unit 204 senses an environmental factor according to a transporting environment, and transmits the sensed environmental factor value to the sensor tag controller 201.

The sensor tag storage unit 202 stores product information, matches the environmental factor value measured by the environmental factor sensor unit 204 with a sensed time value, and stores the matched environmental factor value and time value.

The sensor tag communication unit 203 performs a function of transmitting/receiving data, and particularly receives a signal of activating a program for sensing the environmental factor from a sensor tag control terminal 210.

Further, the sensor tag communication unit 203 transmits the sensed time value and the environmental factor value corresponding to the sensed time value to the distribution company server 110.

The sensor tag controller 201 performs a function of controlling general operations of the sensor tag 200. The sensor tag controller 201 includes a program for sensing the environmental factor and receives a time interval at which the environmental factor is to be sensed during the transporting through the program for sensing the environmental factor from a user in advance.

When receiving the activation signal from the sensor tag control terminal 210, the sensor tag controller 201 activates the program for sensing the environmental factor.

Further, the sensor tag controller 201 senses the environmental factor at a preset time interval through the environmental factor sensor unit 204. At this time, the environmental factor sensed by the environmental factor sensor unit 204 is an environmental factor affecting the quality index for each individual quality analysis item of the food and the total quality index corresponding to freshness of the food, such as temperature, humidity, gas, PH or the like.

When the environmental factor is sensed at the preset time interval through the environmental factor sensor unit 204, the sensor tag controller 201 matches the sensed environmental factor value with the sensed time value and stores the matched environmental factor value and time value in a storage unit 202.

The sensor tag control terminal 210 includes a controller 211, a communication unit 212, and a GPS module 213.

The controller 211 performs a function of controlling general operations of the sensor tag control terminal 210. The controller 211 transmits a signal of activating a program for sensing the environmental factor, determines a current position in real time through the GPS module 213, and transmits a signal of changing the time interval at which the environmental factor is sensed by the sensor tag 200 when arriving at a preset position.

The communication unit 212 transmits the signal of activating the program for sensing the environmental factor and the signal of changing the time interval at which the environmental factor is sensed to the sensor tag 200.

The GPS module 213 communicates with a GPS satellite at a regular time interval to collect coordinate data on a current position of the sensor tag control terminal 210, and transmits the collected coordinate data to the controller 211.

Hereinafter, a process of sensing the environmental factor during the transporting by using the sensor tag and monitoring food quality by using the sensed environmental factor value in a food quality monitoring system will be described with reference to FIGS. 3 to 6.

(1) A Step of Producing/Shipping Food

When an individual packaging is completed to ship the food and a plurality of individually packed food is stacked in a container or palette or an individual box for the transporting, the sensor tag 200 for monitoring an environment change during the transporting is attached to the container or the palette.

Here, it is preferable that the same food which should be transported in the same environment is stacked in the container or palette to which the sensor tag 200 is attached.

Further, the sensor tag 200 stores an inherent ID of the sensor tag, a product name of the food stacked in the container or palette to which the sensor tag is attached, and initial quality information on the food.

(2) A Step of Transporting Food

When transporting of the food starts, the sensor tag 200 activates the program for sensing the environmental factor under a control of the sensor tag control terminal 210 and senses the environmental factor according to the preset time interval.

Further, the sensor tag 200 matches the sensed environmental factor value with a time value at which the environmental factor is sensed and stores the matched environmental factor value and time value. Here, the environmental factor is an environmental factor affecting the quality index for each individual quality analysis item of the food and the total quality index, such as temperature, humidity, gas, PH or the like.

Figure 3:
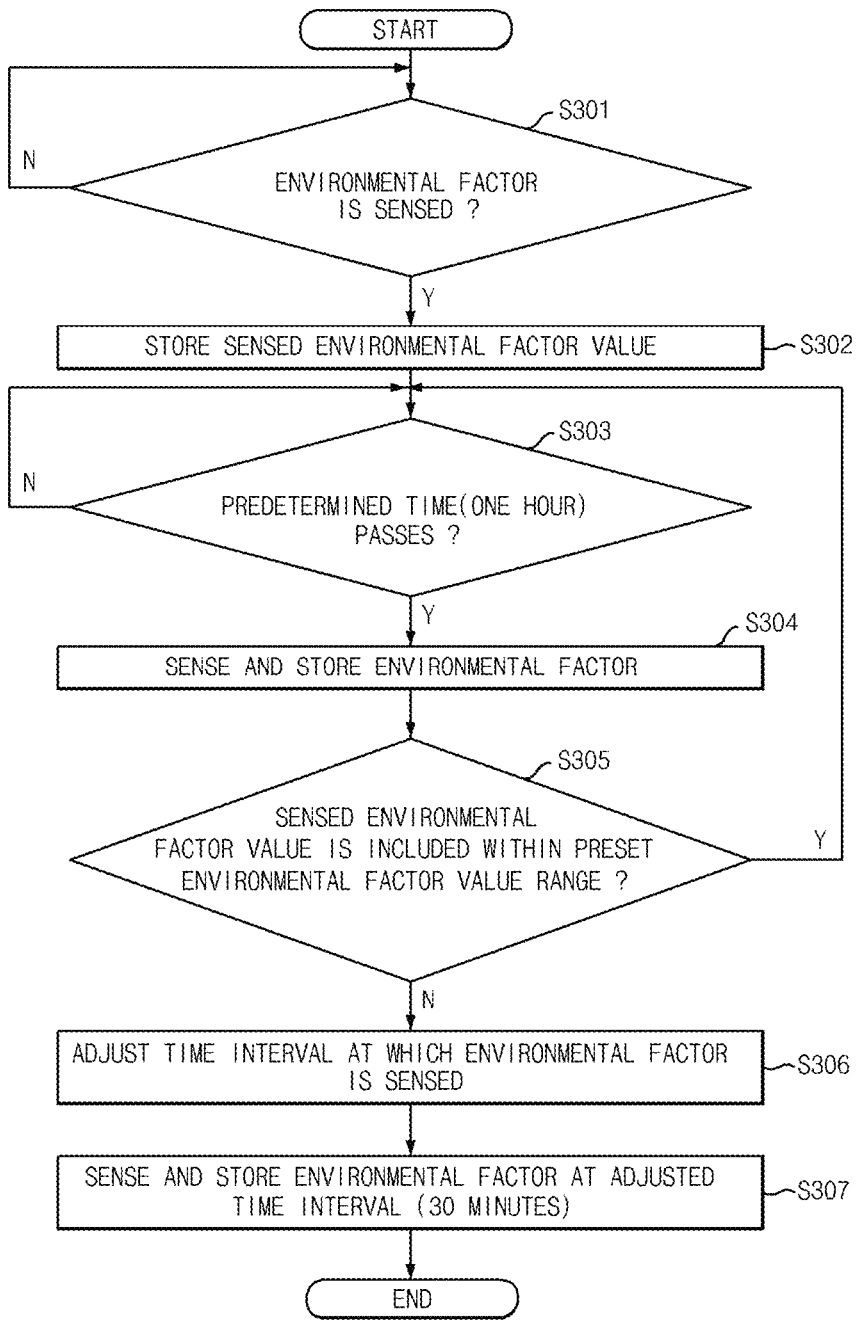
FIG. 3 is a flowchart illustrating a process of sensing an environmental factor during transporting of food according to a first embodiment of the present invention.

FIG. 3 is a flowchart illustrating a process of sensing the environmental factor during the transporting of the food according to a first embodiment of the present invention.

Referring to FIG. 3, when the transporting of the food starts, the sensor tag 200 senses the environmental factor in step S301, and matches the sensed environmental factor value with a sensed time value and stores the matched environmental factor value and time value in step S302.

When a predetermined time passes in step S303, the sensor tag 200 senses the environmental factor, matches the sensed environmental factor value with the sensed time value, and continuously stores the matched environmental factor value and time value in step S304.

However, when the sensed environmental factor value exceeds a preset environmental factor value range in step S305, the sensor tag 200 adjusts the time interval at which the environmental factor is sensed in step S306.

When an environmental factor value range of the food which is being transported is set to the program for sensing the environmental factor as a value equal to or lower than 5° C. and the time interval at which the environment value is sensed is set as one hour, the sensor tag 200 senses the environmental factor at a one hour interval from the time when the environmental factor is initially sensed. At this time, the environmental factor value range and the time interval at which the environment is sensed are preset according to characteristics of the food.

When the environmental factor value sensed at the one hour interval is equal to or larger 5° C., the sensor tag 200 adjusts the time interval at which the environmental factor is sensed.

At this time, it is preferable that the adjusted time interval is preset by the user. When the adjusted time interval is set as 30 minutes, the sensor tag 200 senses the environmental factor at the one hour interval and then senses the environmental factor at a 30 minute interval, matches the time values sensed at the 30 minute interval with the sensed environmental factor values, and stores the matched time values and environmental factor values in step S307.

Figure 4:
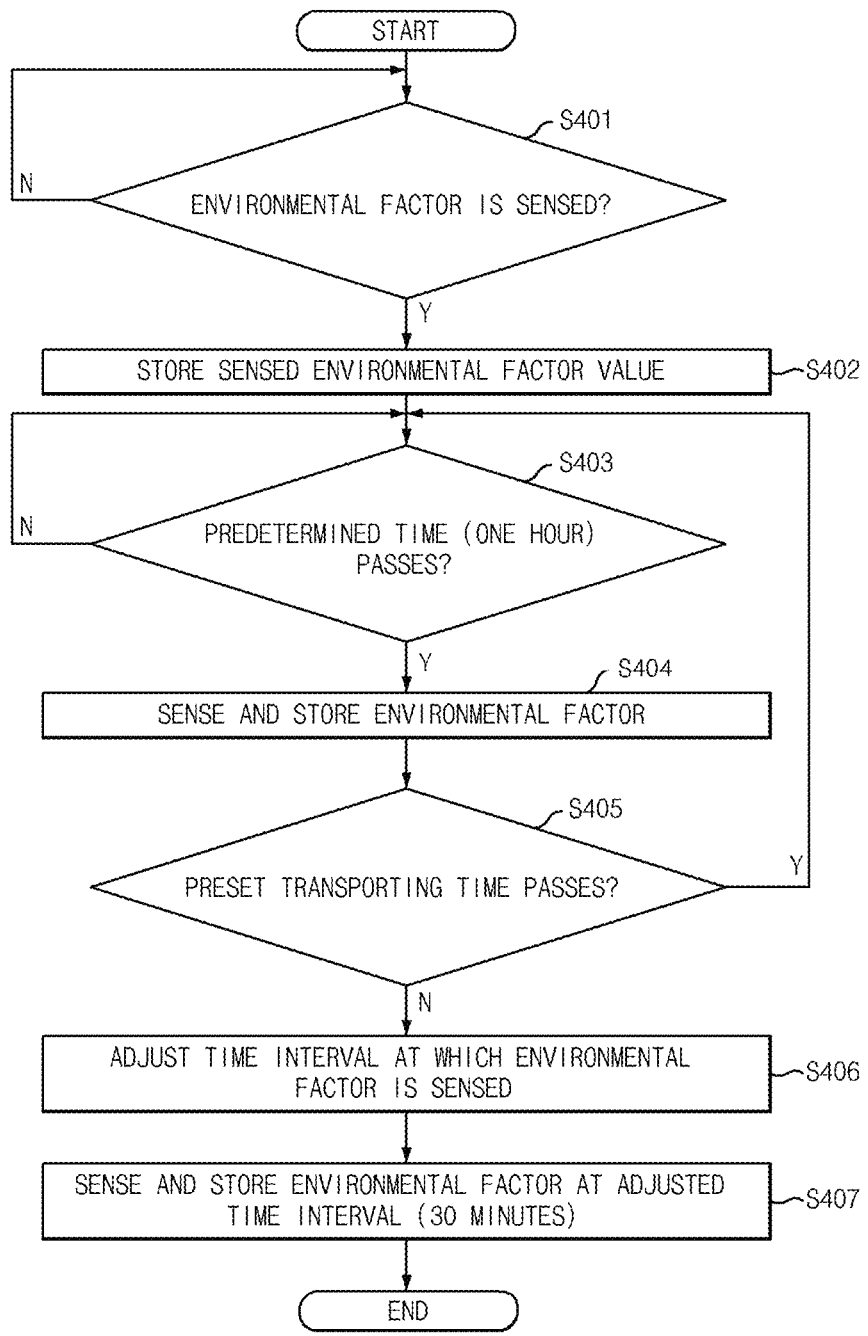
FIG. 4 is a flowchart illustrating a process of sensing an environmental factor during transporting of food according to a second embodiment of the present invention.

FIG. 4 is a flowchart illustrating a process of sensing the environmental factor during the transporting of the food according to a second embodiment of the present invention.

Referring to FIG. 4, when the transporting of the food starts, the sensor tag 200 senses the environmental factor in step S401, and matches the sensed environmental factor value and the sensed time value and stores the matched environmental factor value and time value in step S402.

Whenever a predetermined hour passes in step S403, the sensor tag 200 senses the environmental factor, matches the sensed environmental factor value with the sensed time value, and stores the matched environmental factor value and time value in step S404.

When a preset transporting time passes in step S405, the sensor tag 200 adjusts the time interval at which the environmental factor is sensed in step S406.

For example, in program for sensing the environmental factor, when the transporting time is set as three hours and the interval time at which the environmental factor is sensed for the transporting is set as one hour, the sensor tag 200 senses the environmental factor at a one hour interval from the start of the transporting.

When the transporting continues even after the preset transporting time corresponding to three hours passes while the environmental factor is sensed at the one hour interval, the sensor tag 200 adjusts the time interval at which the environmental factor is sensed.

At this time, it is preferable that the transport time of the food, the time interval at which the environmental factor is sensed during the transporting and the time interval at which the environmental factor is sensed adjusted when the transporting time passes are preset by the user. When the adjusted time interval is set as 30 minutes, the sensor tag 200 senses the environmental factor at the one hour interval and then senses the environmental factor at the 30 minute interval, and matches the sensed environmental factor value with the sensed time value and stores the matched environmental factor value and time value in step S407.

Figure 5:
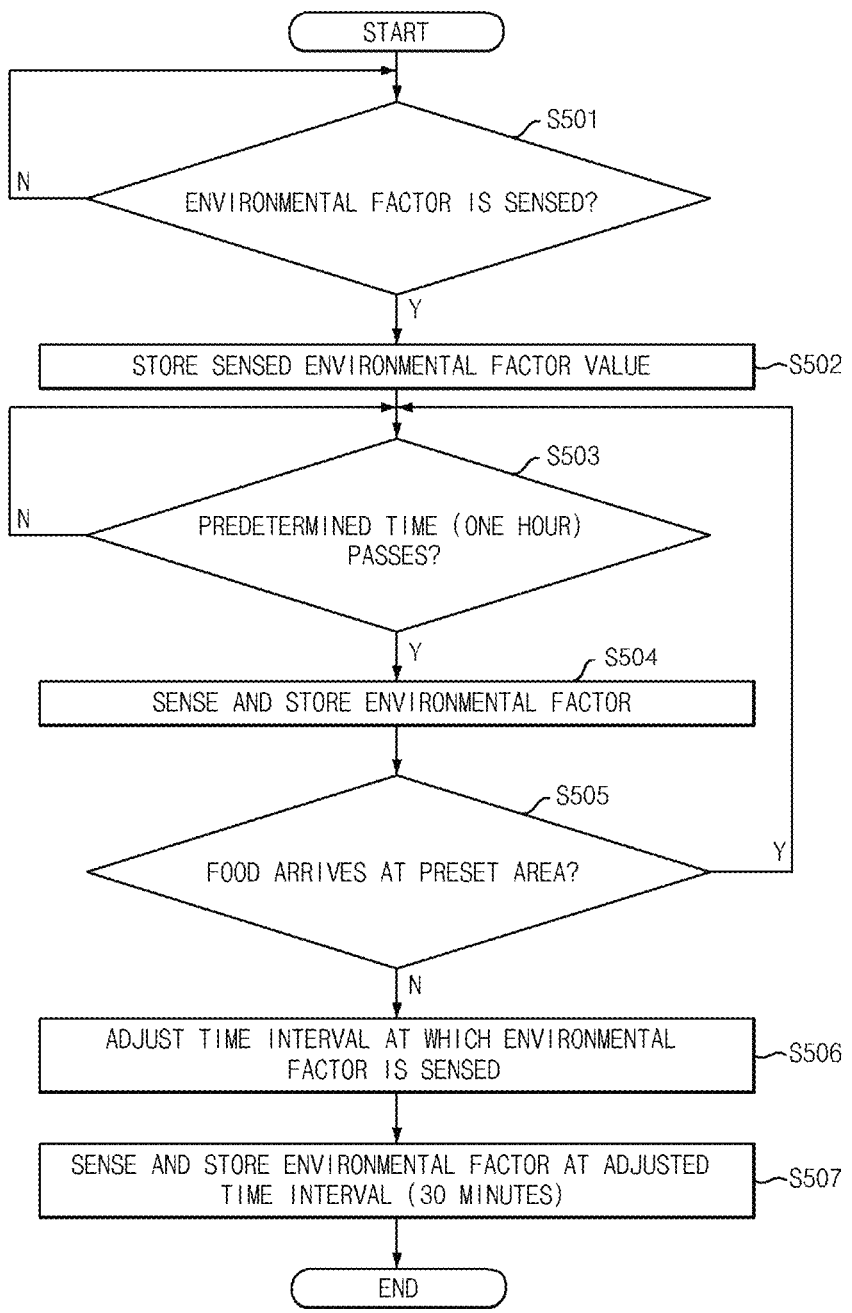
FIG. 5 is a flowchart illustrating a process of sensing an environmental factor during transporting of food according to a third embodiment of the present invention.

FIG. 5 is a flowchart illustrating a process of sensing the environmental factor during the transporting of the food according to a third embodiment of the present invention.

Referring to FIG. 5, when the transporting of the food starts, the sensor tag 200 senses the environmental factor in step S501, and matches the sensed environmental factor value with the sensed time value and stores the matched environmental factor value and time value in step S502.

When a preset time corresponding to one hour passes in step S503, the sensor tag 200 senses the environmental factor, matches the sensed environmental factor value and the sensed time value, and stores the matched environmental factor value and time value in step S504.

When the sensor tag 200 receives a signal of informing that the food arrives at a preset particular area from the sensor tag control terminal 210 in step S505 while sensing the environmental factor at a predetermined time interval, the sensor tag 200 adjusts the time interval at which the environmental factor is sensed to 30 minutes in step S506. At this time, the sensor tag control terminal 210 identifies that the product arrives at the particular area through the GPS module 213 and transmits the signal of informing that the product arrives at the particular area to the sensor tag 200.

The sensor tag 200 senses the environmental factor every 30 minutes, matches the sensed environmental factor value with the sensed time value, and stores the matched environmental factor value and time value in step S507.

At this time, when the sensor tag 200 receives the signal of informing that the product arrives at the particular area from the sensor tag control terminal 210 while sensing the environmental factor at the one hour interval during the transporting, it is preferable to set such that the environmental factor is sensed at the 30 minute interval.

Further, the sensor tag 200 corresponding to the descriptions of FIGS. 3 to 5 senses the environmental factor at a preset time interval. When the sensed environmental factor value is the same as the environmental factor value sensed and stored before, the sensor tag 200 does not store the sensed environmental factor value. When the sensed environmental factor value is different from the environmental factor value sensed and stored before, the sensor tag 200 may store the sensed environmental factor value and the time at which the environmental factor is sensed.

Then, the sensor tag storage unit 202 included in the sensor tag 200 can be efficiently used.

(3) A Step of Stocking Food in the Store by the Distribution Company

Figure 6:
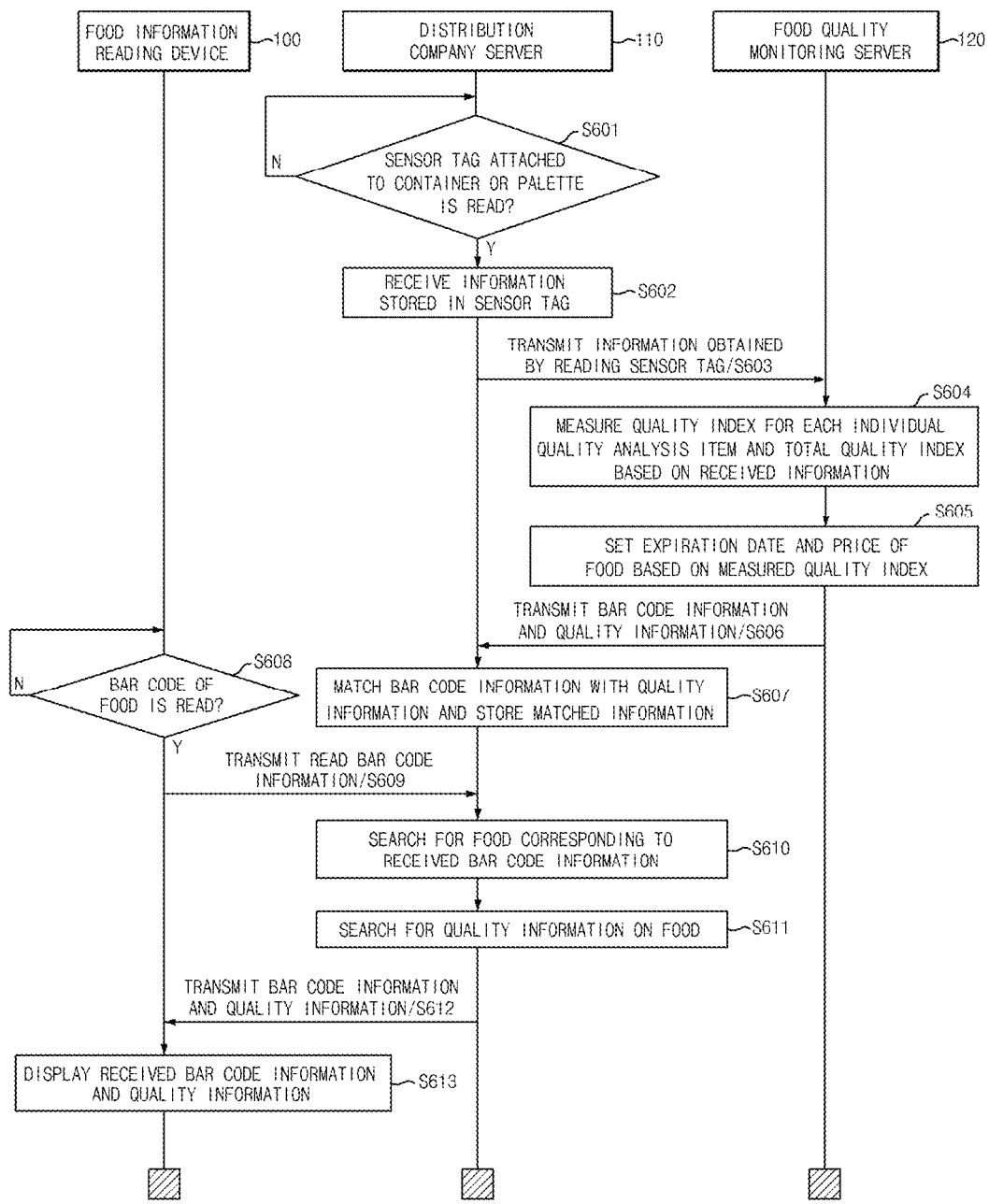
FIG. 6 is a flowchart illustrating a process of performing food quality monitoring in a food quality monitoring system according to an embodiment of the present invention.
Figure 9:
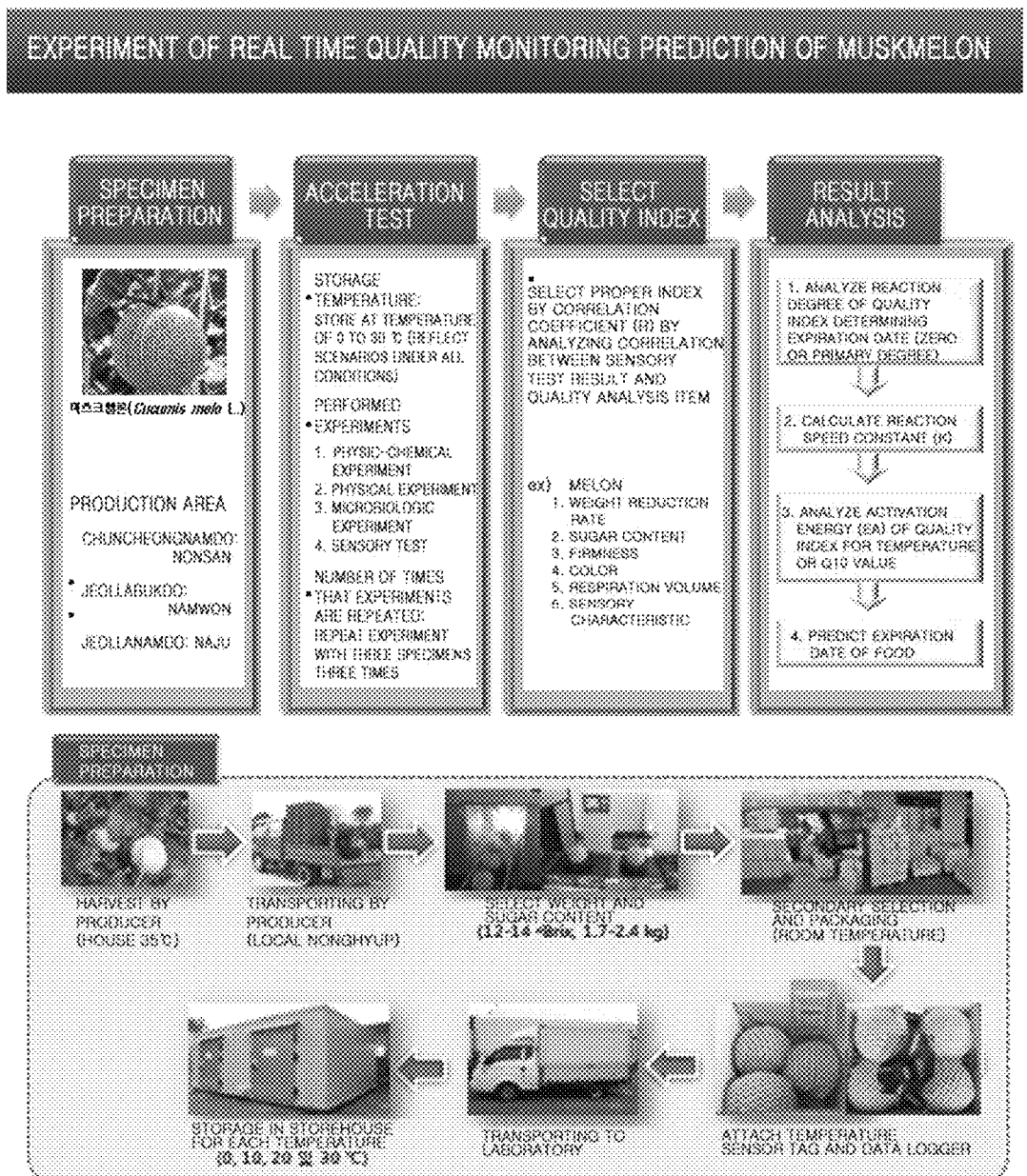
FIGS. 9 to 12 are diagrams illustrating examples of measuring a quality index of a melon according to an embodiment of the present invention.
Figure 10:
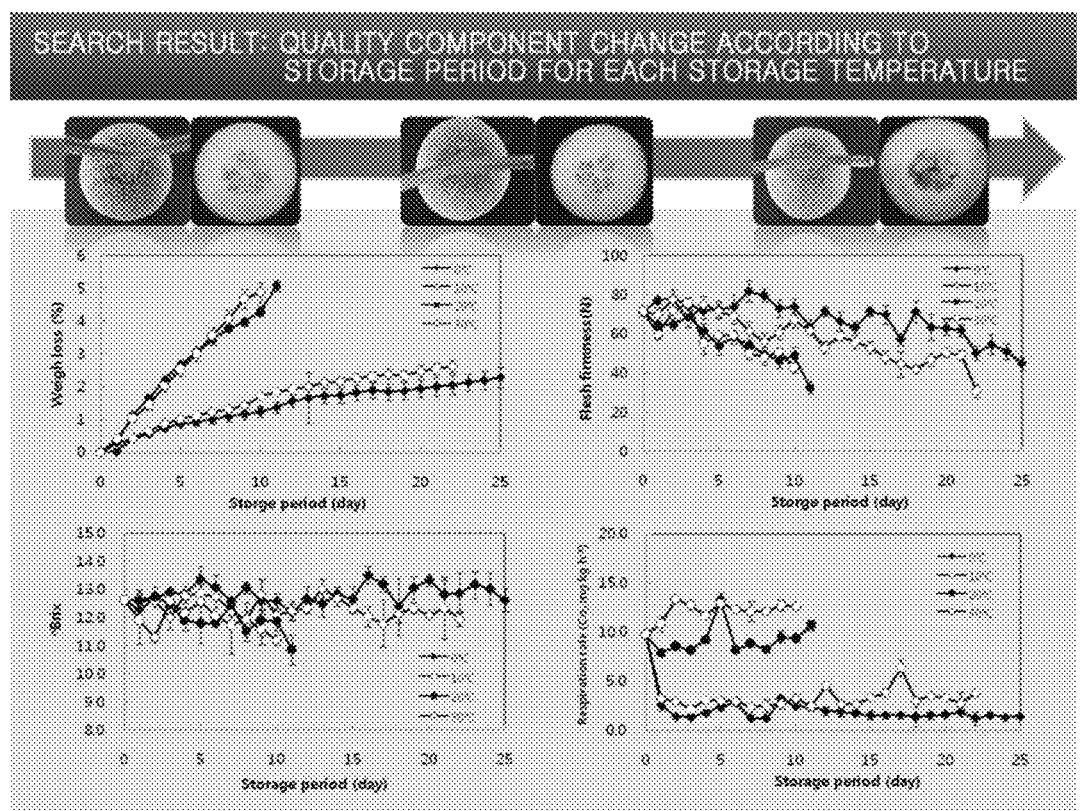
Figure 11:
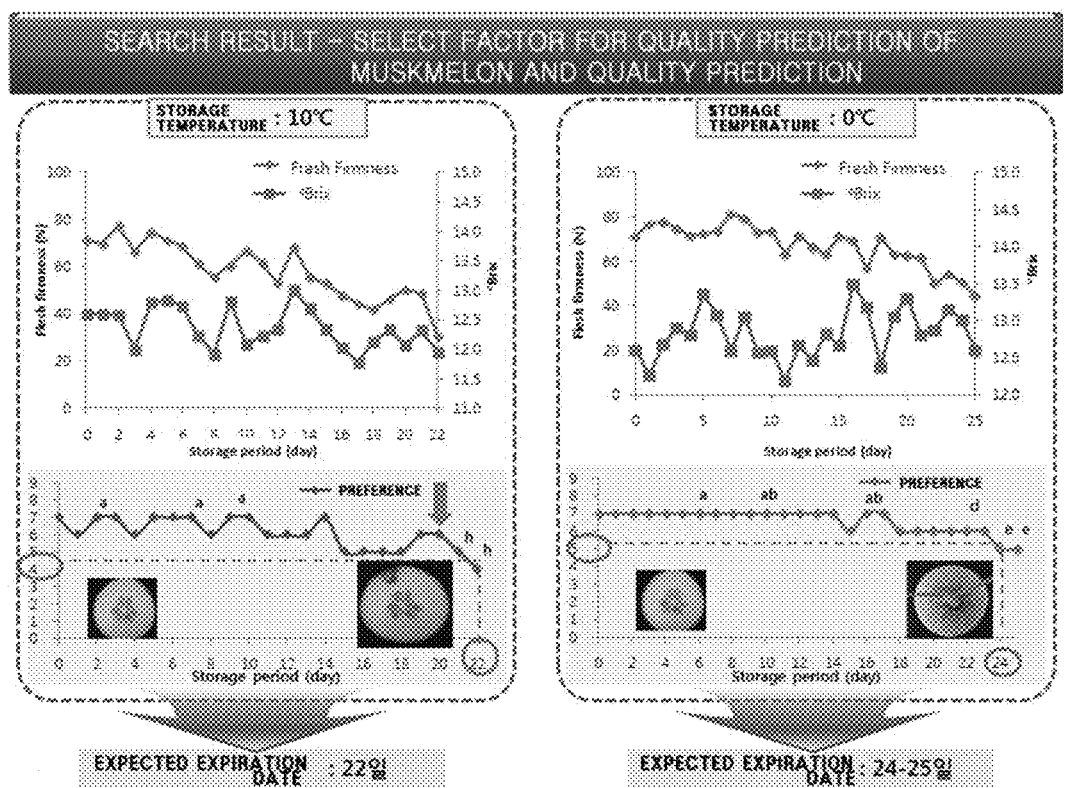
Figure 12:
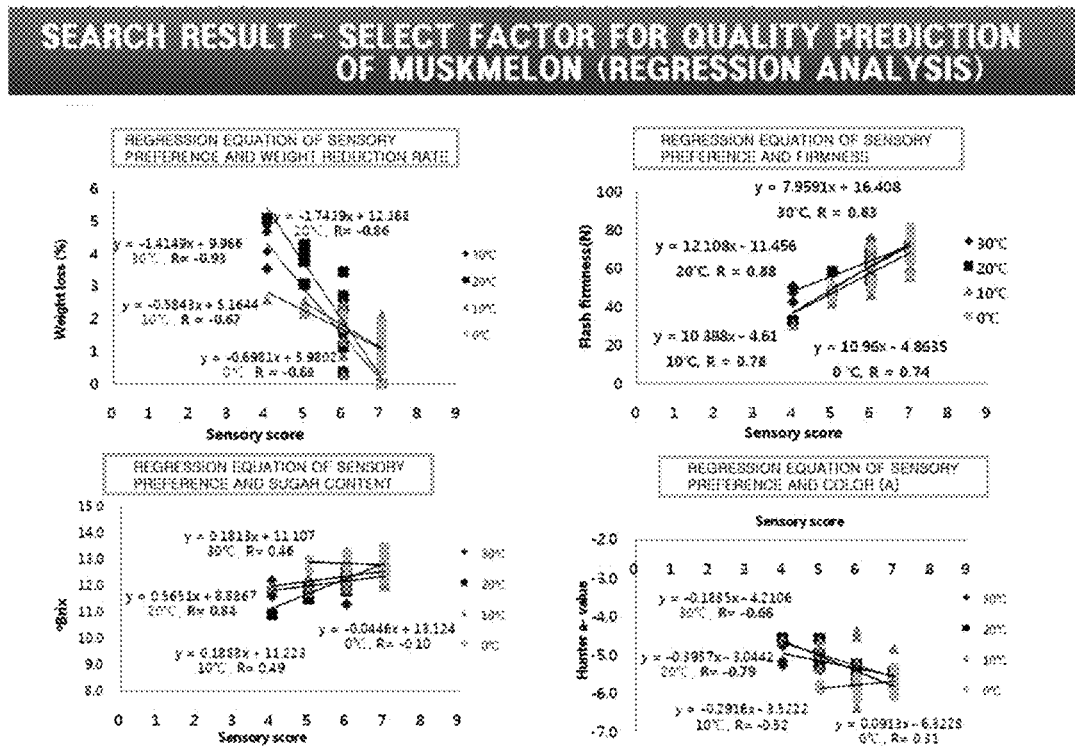

FIG. 6 is a flowchart illustrating a process of performing food quality monitoring in a food quality monitoring system according to an embodiment of the present invention.

When a distribution company delivers food to a consumer, a process of transmitting quality information on the food to the consumer will be described with reference to FIG. 6. When the food arrives in step S601, the distribution company server 110 reads the sensor tag 200 attached to a container or palette on which a plurality of food is stacked by using the sensor tag reader.

The distribution company server 110 receives an inherent ID of the sensor tag, a product name of the food stacked in the container or palette, initial quality information on the food, an environmental factor value sensed at a regular time interval during the transporting process, and a detected time value from the sensor tag reader.

The distribution company server 110 transmits the inherent ID of the sensor tag, the product name of the food stacked in the container or palette, the initial quality information on the food, the environmental factor value sensed at the regular time interval during the transporting process, and the detected time value to the food quality monitoring server 120.

The food quality monitoring server 120 calculates a quality index for each individual quality analysis item of the food and a total quality index based on the initial quality information on the food, the environmental factor value, and the detected time value received from the distribution company server 110 in step S604.

In the quality index for each individual quality analysis item, quality analysis items such as vitamins A, B, and C, minerals, and carbohydrate are set according to characteristics and nutritional contents of the food and the nutritional content values remaining in the food are indicated by a percentage (%) or a numerical value for each set item.

The quality index indicates a corresponding relative percent when 100% is a quality index of food immediately after production, harvest or manufacturing (0% when all quality is lost). That is, the quality index indicates a total quality degree of the food, that is, a relative value of freshness.

Further, the quality index may be expressed in levels such as best (very fresh), excellent (fresh), good (normal), inadequate, return, discount, saleable, edible and the like according to a range of the index value and also expressed in a relative percentage (%) or level based on a nutritive component value of the product or a discoloration degree for consumers sensitive to a total quality degree, freshness, or a particular item of the food.

A process of measuring the quality index of the food will be briefly described. In general, a quality change in the product is analyzed by an Arrhenius equation as illustrated in FIG. 7. The equation is defined as below.

$$-\frac{dQ}{dt} = kQ^n \quad (1)$$

Since the process of measuring the quality index by using Equation (1) is an already known technology, a detailed description thereof will be omitted.

A method of predicting an expiration date by using the quality index of the food will be briefly described. First, while a target product is kept under various environment conditions such as different temperatures, humidity and the like, change amounts of various (physical and chemical) quality factors are measured in each of the environment conditions. Simultaneously, the food quality is sensuously evaluated by a person from a trained panel.

The sensory evaluation provides a sensory score with respect to appearance, smell, texture, taste, and a total evaluation by considering a situation where the food is directly eaten.

In the sensory evaluation, a 9-point rating method, a 7-point rating method or the like is used for a sensory score. At this time, the method is set such that 9 points indicates a most fresh quality (freshness) immediately after the manufacture, 1 point indicates that the quality index is completely depleted, and 5 points or 7 points indicates a saleable time or an edible time, thereby indicating the quality index corresponding to the scores. At this time, a physical chemical quality value of the corresponding quality index is determined.

At this time, a relation between the change in the measured quality factor value and the change in the sensory evaluation value is correlationally analyzed, and a quality factor having a highest correlation is determined as the quality index. Thereafter, a reaction speed of the quality index is analyzed by using Equation (1), and then a reaction speed constant, order of reaction, activation energy, a frequency constant, a temperature coefficient and the like are calculated.

When the constant values are determined, a degree (reaction speed constant, k) of the quality index changed per unit time in a certain temperature can be calculated, and the expiration date of the food in a certain temperature can be set from the calculated degree of the changed quality index. Further, the quality index or a remaining value of the nutrition can be changed or predicted.

A current expiration date setting method sets and marks the expiration date by reflecting annual average temperature and a safety coefficient from the reaction speed constant (k) determined in the above way. However, since an actual food distribution environment is changed hour by hour, a currently marked expiration date does not accurately reflect a variable food distribution environment.

At this time, calculating temperature corresponding to a variable environment parameter in predicting a quality index or expiration date by directly substituting all actual variable measurement values is not easy, and takes a lot of time and causes inconvenience.

Accordingly, if one representative temperature of the variable temperature can be marked, the calculation becomes easy. Such the temperature is marked as Mean Kinetic Temperature (MKT) in FIG. 8 and a quick calculation can be made through application of the MKT. Therefore, the prediction of the quality index or the expiration date requires a process of simplifying transporting and distribution temperature to the MKT, a process of performing modeling by analyzing a reaction speed of the quality index, and a process of performing an operation in a prepared program through linking the processes and displaying the quality index and the expiration date. At this time, a reaction speed for each quality index or a constant for each food according to modeling is built in the quality monitoring server 120 as a database and then the built database is provided.

For example, an experiment of a melon will be described with reference to FIGS. 9 to 12. Firmness has the highest correlation with a sensory evaluation score as a result of testing and analyzing firmness, sugar content, weight change, color, and sensory evaluation (taste, texture, smell, and total evaluation) corresponding to quality parameters, so that the firmness is selected as the quality index of the melon, and the quality and maturity degree of the melon are predicted through analysis of a reaction speed of the firmness in relation to a temperature change.

Figure 13:
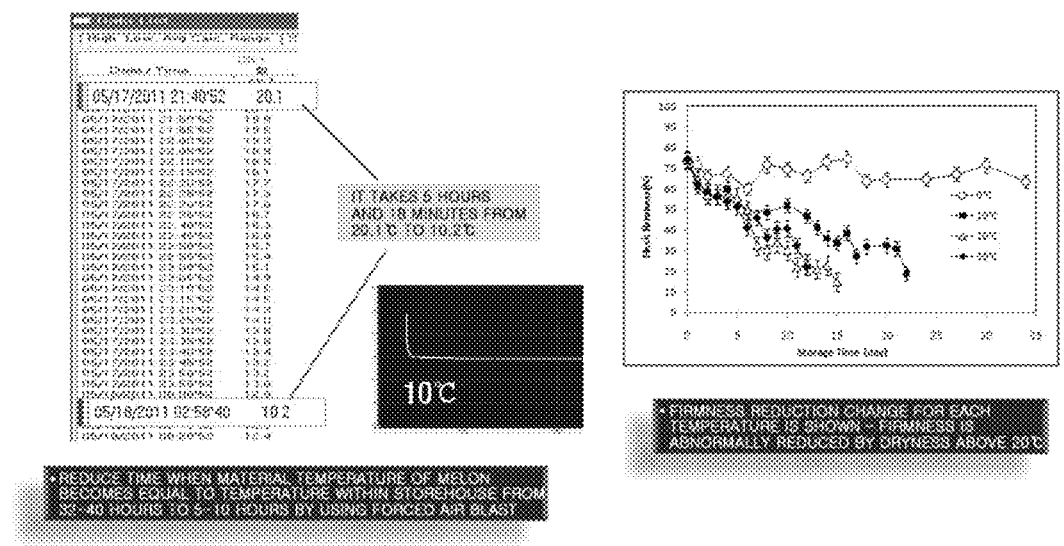
FIG. 13 is a diagram illustrating an example of measuring a quality index of a melon according to another embodiment of the present invention.

In FIG. 13 illustrating the experiment of the melon, data is made by using a change in internal temperature (material temperature).

When the food quality monitoring server 120 measures a quality index for each individual quality analysis item of the food and a total quality index of the food through the aforementioned method in step S604, the food quality monitoring server 120 sets an expiration date and a price of the product based on the measured quality index for each individual quality analysis item and total quality index of the food in step S605.

Further, the food quality monitoring server 120 transmits a plurality of bar code information and quality information which has matched and stored with inherent IDs of the sensor tags transmitted from the distribution company server to the distribution company server 110.

At this time, the plurality of bar code information which is matched and stored with the inherent IDs of the sensor tags, is bar code information attached to a plurality of food stacked in the container or palette to which the sensor tags corresponding to the inherent IDs of the sensor tags are attached.

Further, the quality information includes a current quality index for each individual quality analysis item of the food, a current total quality index, a current remainder until the expiration date, and price.

When receiving the plurality of bar code information and the quality information from the food quality monitoring server 120, the distribution company server 110 matches the plurality of bar code information and the quality information and stores the matched information in step S607.

The food information reading device 100 is installed in a store, and reads a bar code of the product when detecting the bar code of the product within a predetermined range in step S608.

When reading the bar code, the food information reading device 100 transmits information on the read bar code to the distribution company server 110 in step S609.

When receiving the bar code information from the food information reading device 100, the distribution company server 110 identifies whether bar code information corresponding to the received bar code information is stored in step S610.

When there is the bar code information corresponding to the bar code information received from the food information reading device 100, the distribution company server 110 searches for the quality information which matches and stored with the bar code information in step S611.

Further, the distribution company server 110 transmits the bar code information and the quality information corresponding to the bar code information to the food information reading device 100 in step S612.

The food information reading device 100 displays the bar code information and quality information received from the distribution company server 110 on a screen in step S613.

Accordingly, by reading the bar code of the food by the food information reading device 100, the user can accurately detect a current state of the food through a quality index for each individual quality analysis item according to the current state of the food and a total quality index and purchase the food based on an expiration date and price information set according to the current state of the food.

Although it has been described that the sensor tags are attached to the container or palette on which the plurality of food is stacked in the above detailed description, the sensor tag may be attached to each of the food items or attached to a package box containing the plurality of food items to sense an environmental factor value according to an environment change.

The above description has been discussed with reference to exemplary embodiments of the present invention, but the present invention is not limited thereto, and the present invention can be replaced, modified, and changed without departing from the technical idea of the present invention by those skilled in the art.

Figure 14:
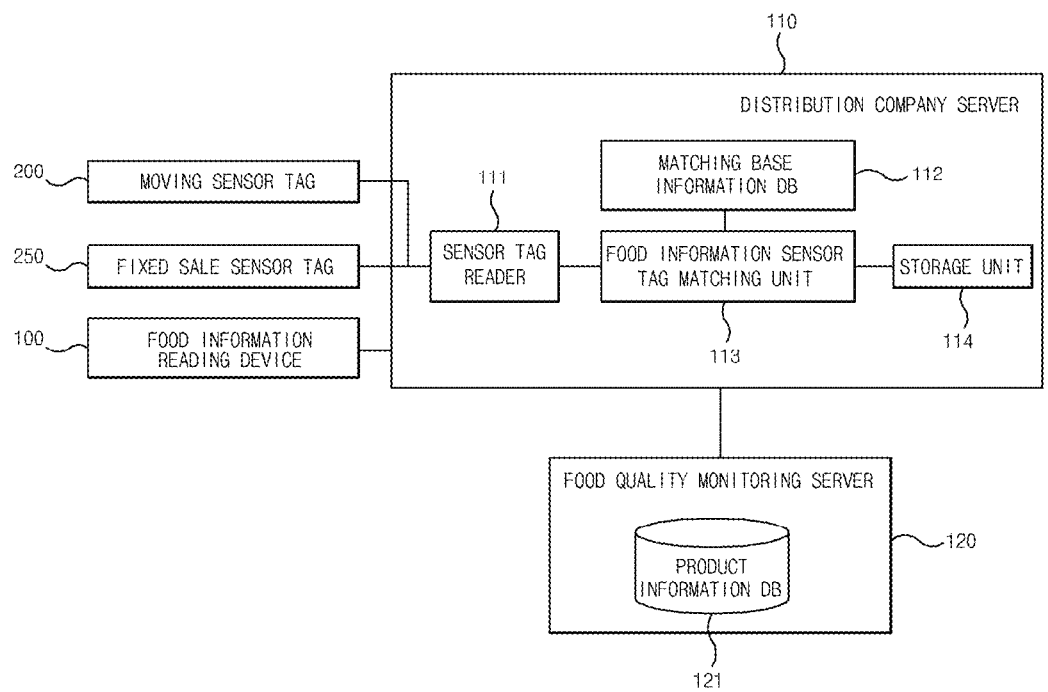
FIG. 14 is a diagram illustrating a configuration of a food quality monitoring system according to another embodiment of the present invention.

FIG. 14 is a diagram illustrating a configuration of a food quality monitoring system according to another embodiment of the present invention.

The food quality monitoring system according to another embodiment of the present invention includes a plurality of moving sensor tags 200, a plurality of fixed sale sensor tags 250, the sensor tag reader 111, the distribution company server 110, and the food quality monitoring server 120.

The food information reading device 100 reads a bar code attached to the food, and transmits information on the read bar code to the distribution company server 110. Further, when receiving the bar code information and quality information on the food from the distribution company server 110, the food information reading device 100 displays the received bar code information and quality information on the screen.

At this time, the food information reading device 100 may be at least one of a fixedly installed kiosk, a smart phone, and a portable reading device for reading the bar code and displaying the bar code information received from the distribution company server 110.

Here, the bar code information on the bar code attached to the food contains national information, manufacturer information, a product name, and a group ID.

Further, instead of the bar code, an electronic tag may be attached to the food. When the electronic tag is attached to the food, information the same as the bar code information is registered in electronic tag information. The following detailed description will be made based on the assumption that the bar code is attached to the food.

The distribution company server 110 includes the sensor tag reader 111 for reading the moving sensor tag 200 and the fixed sale sensor tag 250, and receives an inherent ID of the moving sensor tag, a product name, initial quality information on the food, an environmental factor value sensed during the transporting process, and a time value at which the environmental factor is sensed extracted by reading the moving sensor tag 200 attached to the container or palette on which the food is stacked by the sensor tag reader 111 and an inherent ID of the fixed sale sensor tag, a product name, initial quality information on the food, an environmental factor value sensed during the transporting process, and the environmental factor extracted by reading the fixed sale sensor tag 250.

At this time, the initial quality information on the food contains a quality index for each individual quality analysis item and a total quality index, and an expiration date and price information according to the quality indexes.

Further, the distribution company server 110 transmits the inherent IDs of the moving sensor tags of the food stacked in the container or the palette, the product name, the initial quality information on the food, the environmental factor value sensed during the transporting process, the time value, the inherent IDs of the fixed sale sensor tags, the product name, the initial quality information on the food, the environmental factor value sensed during the transporting process, and the time value to the food quality monitoring server 120.

When receiving the bar code information and quality information on the food stacked in the container or the palette from the food quality monitoring server 120, the distribution company server 110 matches the bar code information with the quality information and stores the matched quality information. When receiving the bar code information and the quality information of the food matched in the fixed sale sensor tag 250, the distribution company server 110 matches the bar code information with the quality information on the food and stores the matched quality information.

At this time, the quality information contains a quality index of the food for each individual quality analysis item, a total quality index, an expiration data, and price information.

The individual quality analysis item corresponds to the number of bacteria or nutritional contents (nutritional content value) for each nutritional content contained in the food, and the individual quality analysis item is changeable according to a characteristic and nutritive component of the food.

The distribution company server 110 matches the food information stored in the moving sensor tag 200 with the fixed sale sensor tag and transmits the environmental factor value, the time value at which the environmental factor is sensed, and the food information to the food quality monitoring server 120, and may include a matching base information database 112 and a food information sensor tag matching unit 113.

The matching base information database 112 of the distribution company server 110 pre-stores matched food information and information on the inherent IDs of the fixed sale sensor tags.

Further, after receiving the food information stored in the moving sensor tag 200 through the sensor tag reader 111, the food information sensor tag matching unit 113 of the distribution company server 110 identifies the received food information from the matching base information database 112, matches the identified food information with the fixed sale sensor tags, and then stores the matched food information and fixed sale sensor tags in the storage unit 114.

The food quality monitoring server 120 receives the environmental factor values sensed by the moving sensor tag 200 and the fixed sale sensor tag 250, the time values, and the food information stored in the moving sensor tag 200 and the fixed sale sensor tag 250 from the distribution company server 110, measures a current quality index for each individual analysis item of the food, a total quality index based on the received environmental factor values, time values, and food information, sets a price of the food based on the measured quality index for each individual quality analysis item of the food and total quality index, and transmits bar code information or electronic tag information corresponding to a plurality of food items which match the fixed sale sensor tags 250, the quality index for each individual quality analysis item of the food, the total quality index, and the price of the food to the distribution company server 110.

The food quality monitoring server 120 matches inherent IDs of the moving sensor tags attached to the container or the palette with a plurality of bar code information attached to the container or the palette and stores the matched inherent IDs and bar code information, and matches inherent IDs of the fixed sale sensor tags with a plurality of bar code information attached to the container or palette and stores the matched inherent IDs and bar code information. Further, the quality monitoring server 120 includes a database for storing a standard quality index according to the individual quality analysis item of the food and a standard total quality index for each food.

When receiving the inherent ID of the moving sensor tag attached to the container or palette on which the food is stacked, the product name, initial quality information on the food, the environmental factor value, and the detected time value from the distribution company server 110, the food quality monitoring server 120 calculates a current quality index for each individual quality analysis item of the food and the total quality index by using the initial quality information on the food, the environmental factor value, and the detected time value. When receiving the inherent ID of the fixed sale sensor tag attached to the container or palette on which the food is stacked, the product name, initial quality information on the food, the environmental factor value, and the detected time value, the food quality monitoring server 120 calculates a current quality index for each individual quality analysis item of the food and the total quality index by using the initial quality information on the food, the environmental factor value, and the detected time value. At this time, in calculating the current quality index for each individual quality analysis item of the food and the total quality index through the inherent ID of the fixed sale sensor tag, the initial quality information on the food, the environmental factor value, and the detected time value, the food quality monitoring server 120 performs the calculating by combining the quality index for each individual quality analysis item of the food and the total quality index calculated through the inherent ID of the moving sensor tag.

Further, the food quality monitoring server 120 sets an expiration date and price of the food based on the quality index for each individual quality analysis item according to the current state of the food and the total quality index and transmits quality information including the quality index for each individual quality analysis item of the food, the total quality index, the expiration date, and a proper price to the distribution company server 110 together with the plurality of bar code information which are matched and stored with the inherent IDs of the moving sensor tags and the inherent IDs of the fixed sale sensor tags.

The moving sensor tag 200 and the fixed sale sensor tag 250 includes the sensor tag controller 201, the sensor tag storage unit 202, the sensor tag communication unit 203, and the environmental factor sensor unit 204 as illustrated in FIG. 2. At this time, the moving sensor tag 200 and the fixed sale sensor tag 250 are configured by a wireless sensor network, and can transmit a sensed environment value and time value to another moving sensor tag, another fixed sale sensor tag, or the distribution company server.

A process of sensing the environmental factor during the transporting by using the sensor tag and monitoring food quality by using the sensed environmental factor value in a food quality monitoring system will be described.

First, as described in FIGS. 3 to 5, after a process of producing/shipping the food and a process of transporting the food, a process of transmitting the food to a distribution company and a store is performed.

Figure 15:
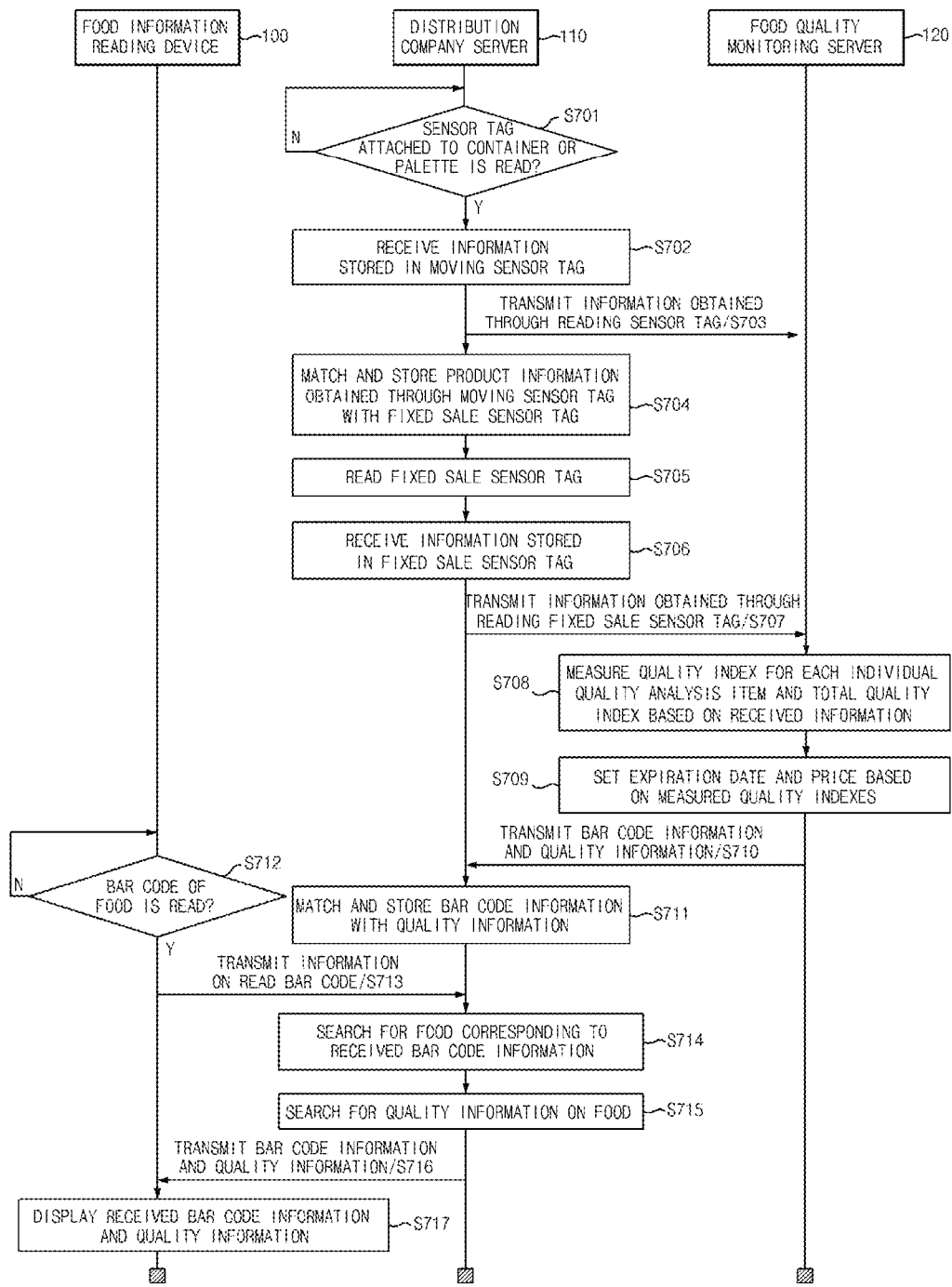
FIG. 15 is a flowchart illustrating a process of performing food quality monitoring in a food quality monitoring system according to another embodiment of the present invention.

FIG. 15 is a flowchart illustrating a process of performing food quality monitoring in a food quality monitoring system according to a second embodiment of the present invention.

A process of transmitting quality information on the food to a consumer when the food is transmitted from the distribution company to the consumer will be described with reference to FIG. 15. When the food arrives, the distribution company server 110 reads the moving sensor tag 200 attached to the container or palette on which a plurality of food is stacked by using the sensor tag reader 111 in step S701.

The distribution server 110 receives the inherent ID of the moving sensor tag, product information (product name and initial quality information on the food) on the food stacked in the container or palette, the environmental factor value sensed at regular time intervals during the transporting process by the moving sensor tag 200 and the sensed time value from the sensor tag reader 111 in step S702.

The distribution company server 110 transmits the inherent ID of the moving sensor tag, the product name of the food stacked in the container or palette, the initial quality information on the food, the environmental factor value sensed at regular time intervals during the transporting process by the moving sensor tag 200, and the detected time value to the food quality monitoring server 120 in step S703.

Figure 16:
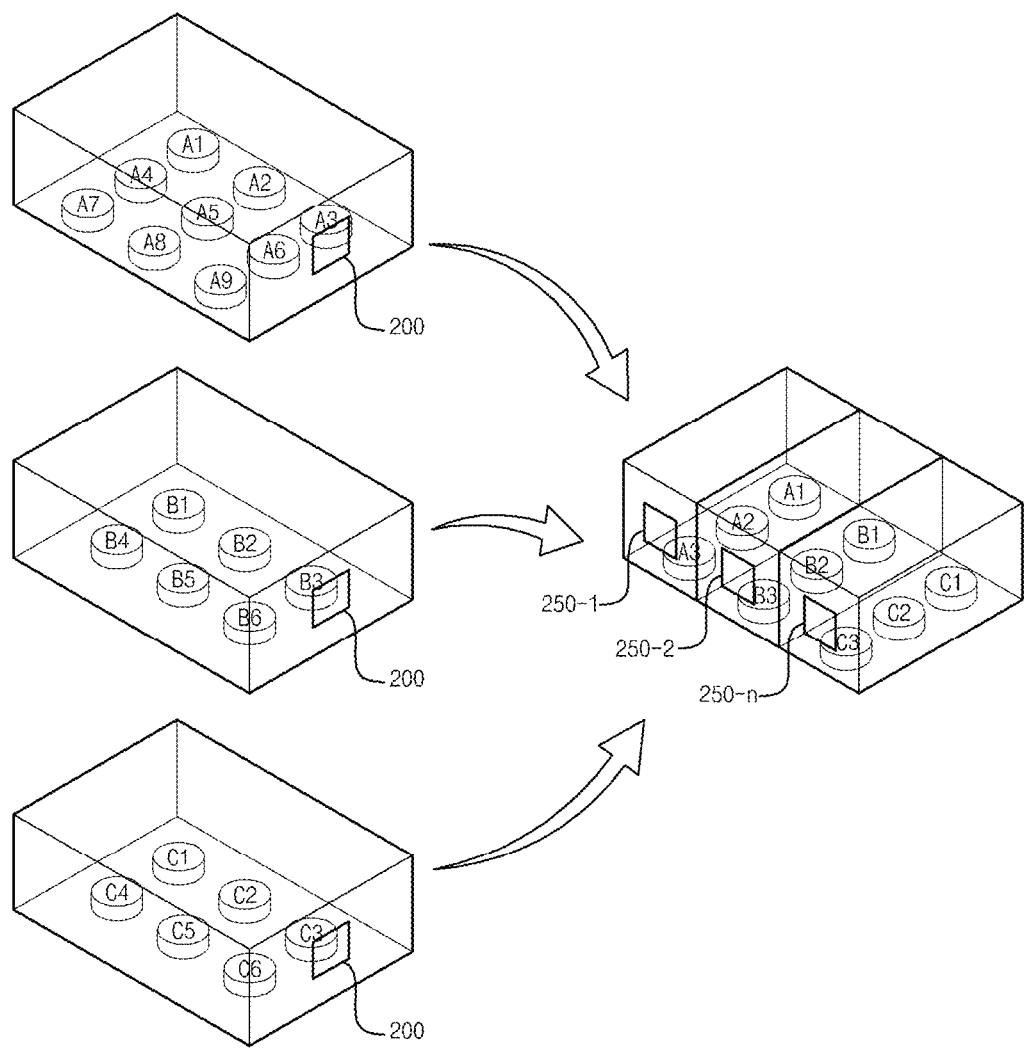
FIG. 16 is a diagram illustrating a state where a plurality of food distributed by means of a container or palette is moved to a counter to which a fixed sale sensor tag is attached according to another embodiment of the present invention.

FIG. 16 is a diagram illustrating a state where a plurality of food distributed by means of the container or palette is moved to a counter to which the fixed sale sensor tag is attached.

As illustrated in FIG. 16, the plurality of food distributed by means of the container or palette is moved to the counter to which the fixed sale sensor tag 250 is attached.

Then, the distribution company server 110 matches product information (bar code information) of the food transmitted through the moving sensor tag 200 and the fixed sale sensor tag 250 and then stores the matched product information and fixed sale sensor tag.

Figure 17:
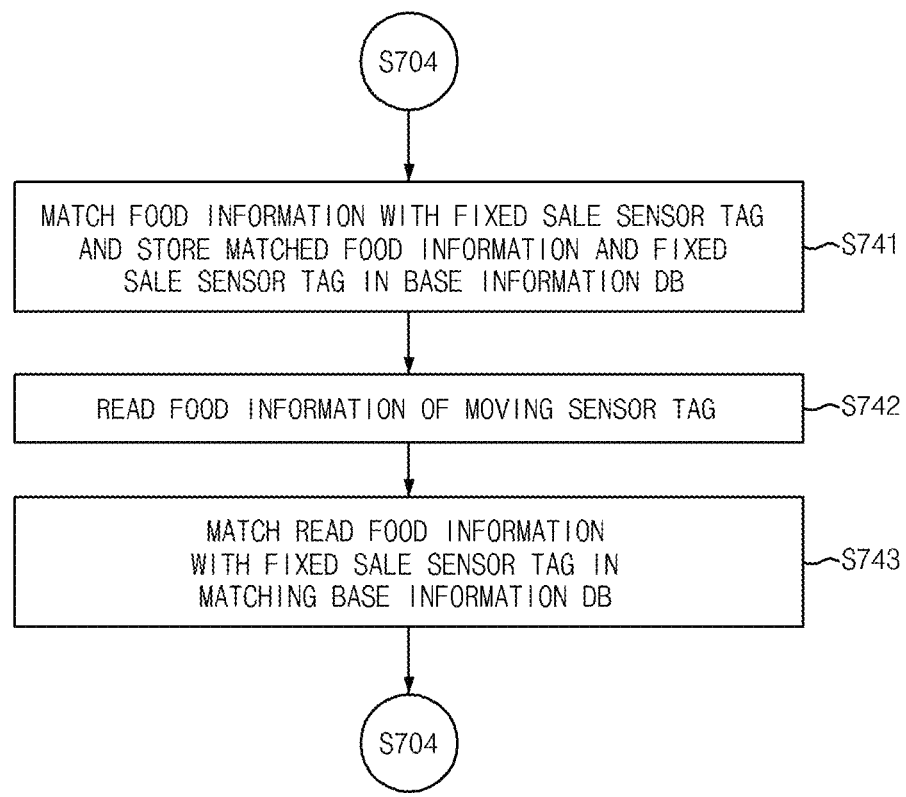
FIG. 17 is a flowchart illustrating a process of matching food information of a mobile sensor tag with an inherent ID of a fixed sale sensor tag during the process of performing the food quality monitoring in the food quality monitoring system according to FIG. 14.

Hereinafter, a method in which the distribution company server 110 matches the product information transmitted from the moving sensor tag 200 and the fixed sale sensor tag 250 will be described with reference to FIG. 17.

First, the distribution company server 110 matches and stores each piece of food information and the inherent ID of the fixed sale sensor tag of the counter where the food information is displayed and stores the matched food information and inherent IDs in the matching base information database 112 in step S741. For example, when it is assumed that apples corresponding to the food information are displayed on an "A counter", grapes are displayed on a "B counter", and melons are displays on a "C counter", since each fixed sale sensor tag is attached to each counter, the food information and the inherent ID of the fixed sale sensor tag can be matched and then stored. At this time, since the food information matches the inherent ID of the fixed sale sensor tag, information on each counter to which the fixed sale sensor tag is attached and an RFID tag or bar code including the food information can be output again and then attached to the product. In general, when the distribution company changes information on the corresponding product and price information, the bar code having the changed information can be output and attached to the corresponding product to be used.

Subsequently, the distribution company server 110 reads the food information stored in the moving sensor tag 200 by using the sensor tag reader 111 in step S742.

When the food information stored in the moving sensor tag 200 is the "apple", the food information sensor tag matching unit 113 of the distribution company server 110 identifies the "apple" corresponding to the food information from the matching base information database 112, matches the product information and the inherent ID of the fixed sale sensor tag attached to the "A counter", and stores the matched product information and inherent ID in the storage unit 114 in step S743.

The distribution company server 110 reads the fixed sale sensor tag 250 attached to the counter by using the sensor tag reader 111 in step S705.

The distribution company server 110 receives the inherent ID of the fixed sale sensor tag, product information (product name and initial quality information on the food) of the food stacked in the container or palette, the environmental factor value sensed at regular time interval during the storage by the fixed sale sensor tag 250 and the sensed time value from the sensor tag reader 111 in step S706.

Thereafter, the distribution company server 110 transmits the environmental factor value sensed at regular time interval during the storage by the fixed sale sensor tag 250 and the detected time value to the food quality monitoring server 120 in step S707.

The food quality monitoring server 120 calculates the quality index for each individual quality analysis item of the food and the total quality index based on the initial quality information of the food, the environmental factor value, and the detected time value received from the distribution company server 110 in step S708.

In the quality index for each individual quality analysis item, quality analysis items such as vitamins A, B, and C, minerals, and carbohydrates are set according to characteristics and nutritive components of the food and the nutritive component values remaining in the food are indicated by a percentage (%) or a numerical value for each set item.

The quality index indicates a corresponding relative percent when 100% is a quality index of food immediately after production, harvest or manufacturing (0% when all quality is lost). That is, the quality index indicates a total quality degree of the food, that is, a relative value of freshness.

Further, the quality index may be expressed in levels such as best (very fresh), excellent (fresh), good (normal), inadequate, return, discount, salable, edible and the like according to a range of the index value and also expressed in a relative percentage (%) or level based on a nutritive component value of the product or a discoloration degree for consumers sensitive to a total quality degree, freshness, or a particular item of the food.

A process of measuring the quality index of the food will be briefly described. In general, a quality change in the product is analyzed by an Arrhenius equation as illustrated in FIG. 7. The equation is defined as below.

$$-\frac{dQ}{dt} = kQ^n \quad (1)$$

Since the process of measuring the quality index by using Equation (1) is an already known technology, a detailed description thereof will be omitted.

A method of predicting an expiration date by using the quality index of the food will be briefly described. First, while a target product is kept under various environment conditions such as different temperatures, humidity and the like, change amounts of various (physical and chemical) quality factors are measured in each of the environment conditions. Simultaneously, the food quality is sensuously evaluated by a person from a trained panel.

The sensory evaluation provides a sensory score with respect to appearance, smell, texture, taste, and a total evaluation by considering a situation where the food is directly eaten.

In the sensory evaluation, a 9-point rating method, 7-point rating method or the like is used for a sensory score. At this time, the method is set such that 9 points indicates a most fresh quality (freshness) immediately after the manufacture, 1 point indicates that the quality index is completely depleted, and 5 points or 7 points indicates a saleable time or an edible time, thereby indicating the quality index corresponding to the scores. At this time, a physical chemical quality value of the corresponding quality index is determined.

At this time, a relation between the change in the measured quality factor value and the change in the sensory evaluation value is correlationally analyzed, and a quality factor having highest correlation is determined as the quality index. Thereafter, a reaction speed of the quality index is analyzed by using Equation (1), and then a reaction speed constant, order of reaction, activation energy, a frequency constant, a temperature coefficient and the like are calculated.

When the constant values are determined, a degree (reaction speed constant, k) of the quality index changed per unit time in a certain temperature can be calculated, and the expiration date of the food in a certain temperature can be set from the calculated degree of the changed quality index. Further, the quality index or a remaining value of the nutrition can be changed or predicted.

A current expiration date setting method sets and marks the expiration date by reflecting annual average temperature and a safety coefficient from the reaction speed constant (k) determined in the above way. However, since an actual food distribution environment is changed hour by hour, a currently marked expiration date does not accurately reflect a variable food distribution environment.

At this time, calculating temperature corresponding to a variable environment parameter in predicting a quality index or expiration date by directly substituting all actual variable measurement values is not easy, and takes a lot of time and causes inconvenience.

Accordingly, if a representative temperature of the variable temperature can be marked, the calculation becomes easy. Such a temperature is marked as a Mean Kinetic Temperature (MKT) in FIG. 8 and a quick calculation can be made through application of the MKT. Therefore, the prediction of the quality index or the expiration date requires a process of simplifying transporting and distribution temperature to the MKT, a process of performing modeling by analyzing a reaction speed of the quality index, and a process of performing an operation in a prepared program through linking the processes and displaying the quality index and the expiration date.

At this time, a constant for each food according to a reaction speed for each quality index or modeling is built in the quality monitoring server 120 as a database and then the built database is provided.

For example, an experiment of a melon will be described with reference to FIGS. 9 to 12. Firmness has the highest correlation with a sensory evaluation score as a result of testing and analyzing firmness, sugar content, weight change, color, and sensory evaluation (taste, texture, smell, and total evaluation) corresponding to quality parameters, so that the firmness is selected as the quality index of the melon, and the quality and maturity degree of the melon are predicted through analysis of a reaction speed of the firmness in relation to a temperature change.

Figure 18:
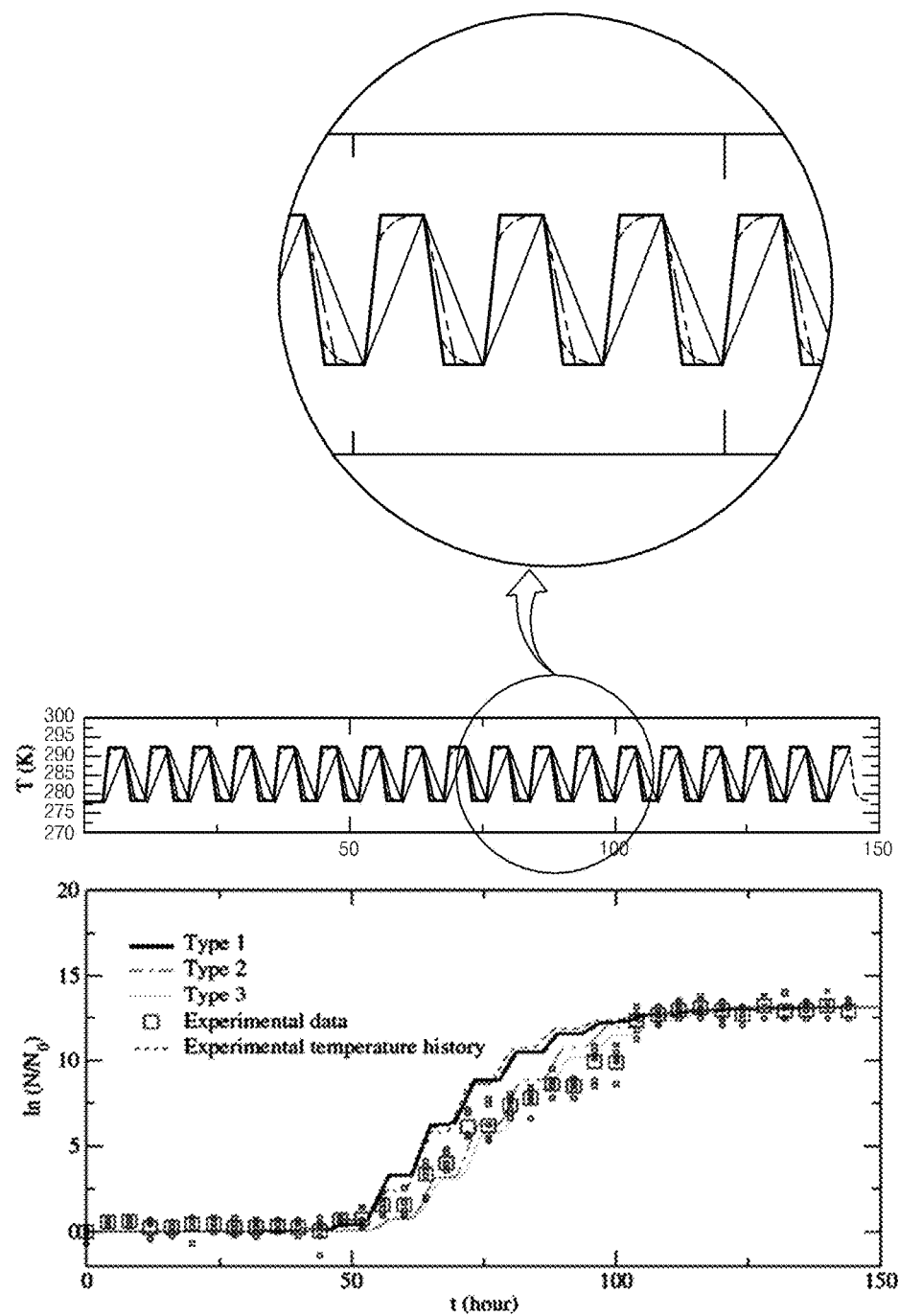
FIG. 18 is a diagram illustrating an example of measuring a quality index of milk according to another embodiment of the present invention.

FIG. 18 illustrates and example of an experiment of milk. A general bacteria has the highest correlation with the sensory evaluation score as a result of testing and analyzing acidity and general bacteria corresponding to the quality parameters, so that the number of general bacteria is selected as the quality index of milk, and quality is predicted through analysis of the acidity and the general bacteria in relation to a temperature change.

Figure 19A:
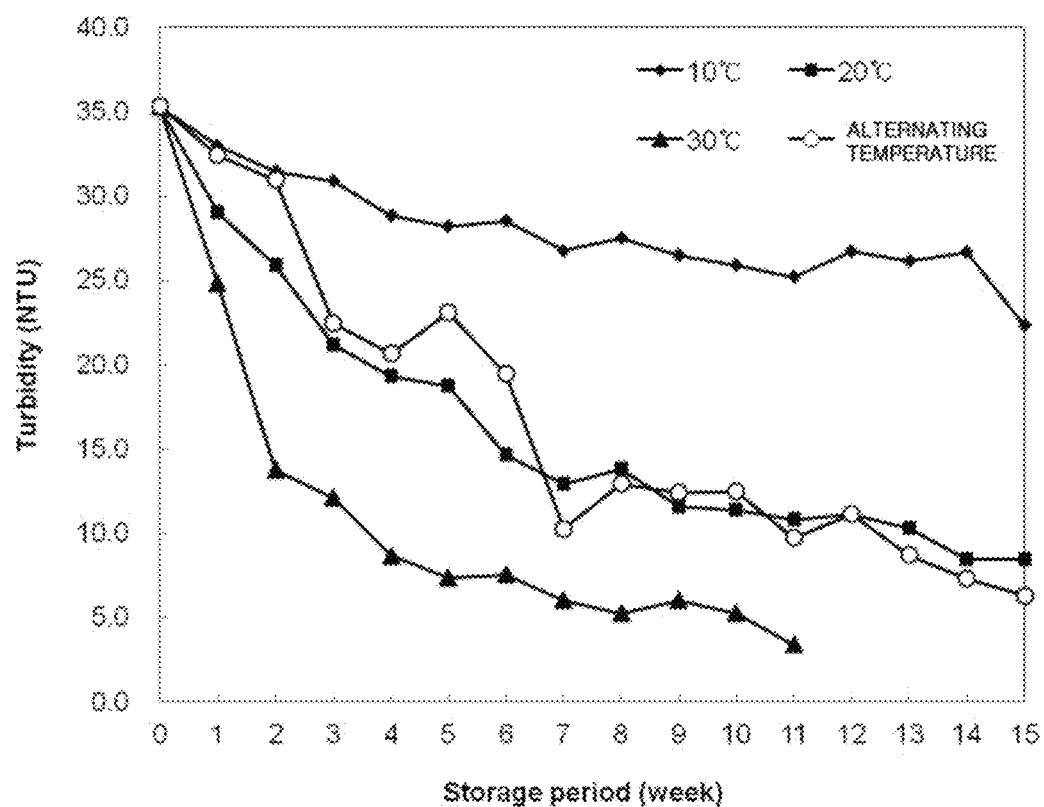
FIGS. 19A to 19D are diagrams illustrating examples of measuring a quality index of rice according to another embodiment of the present invention.
Figure 19B:
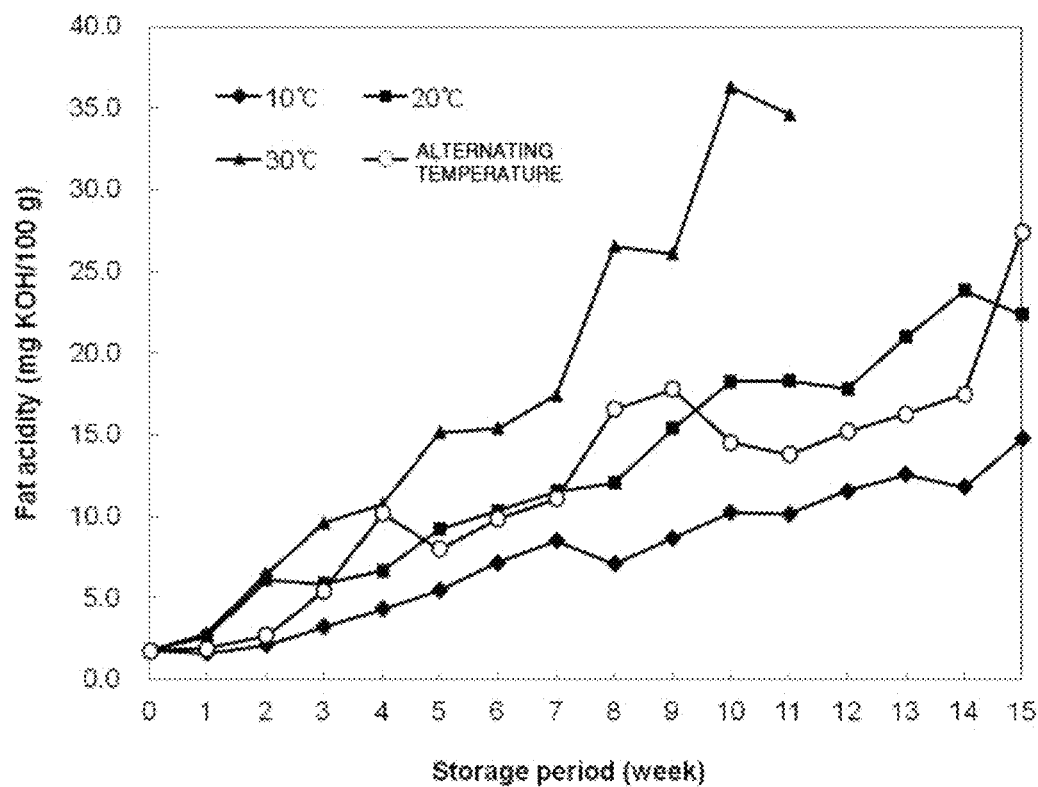
Figure 19C:
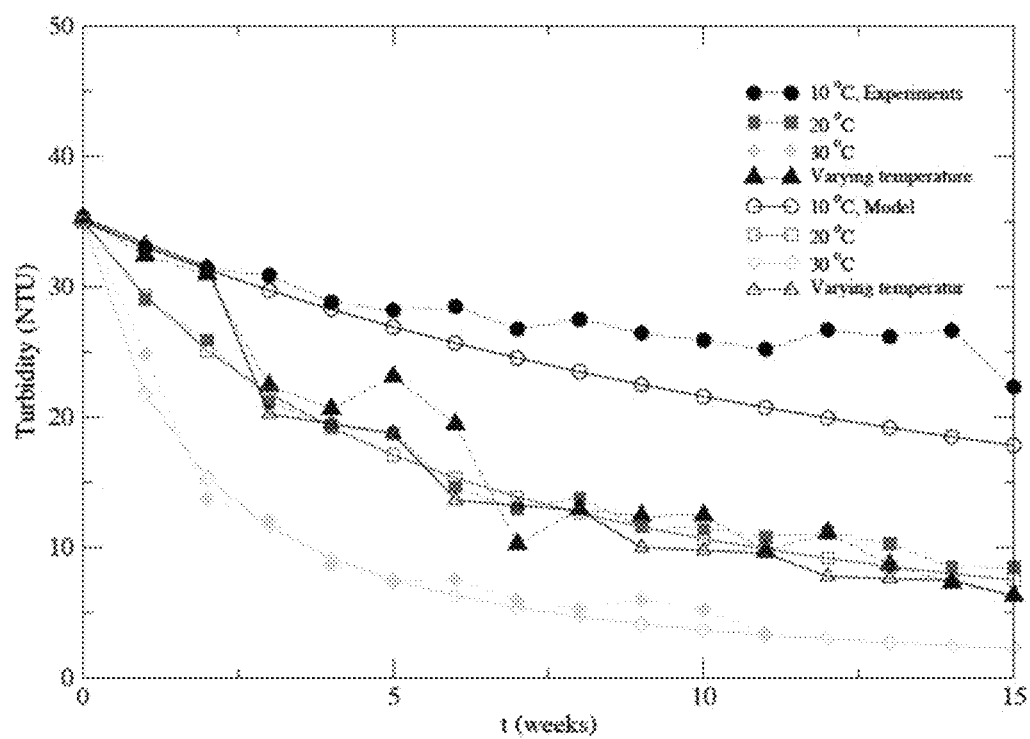
Figure 19D:
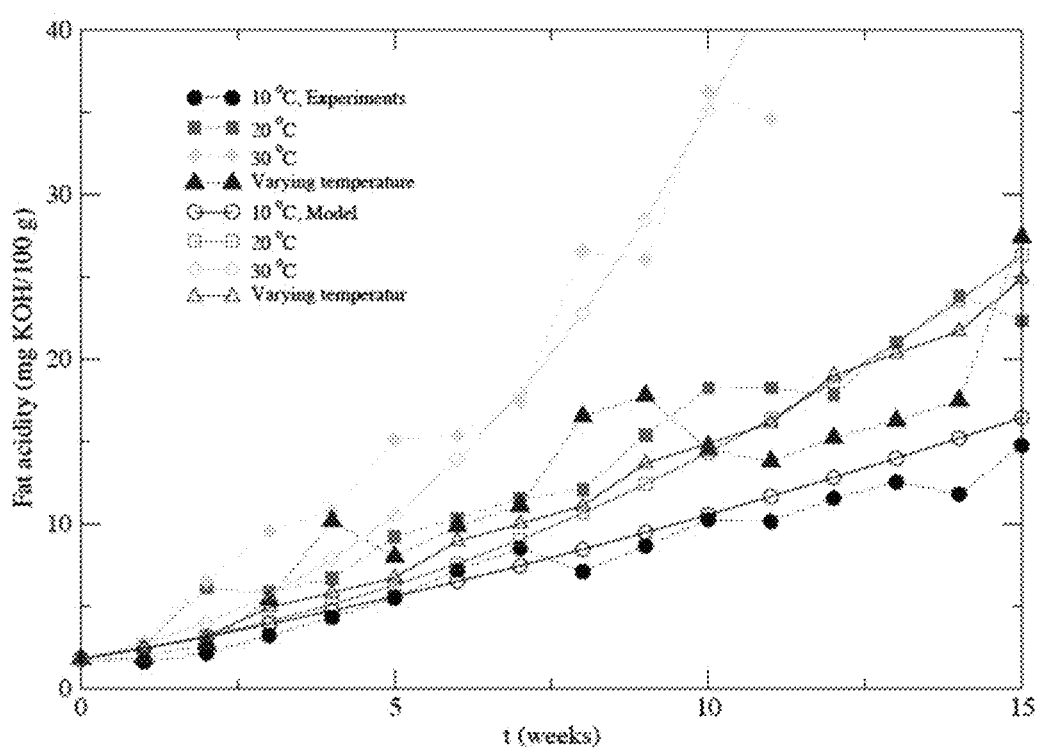

FIG. 19A is an experiment graph illustrating turbidity among quality changes according to a temperature change in newly harvested rice during storage, FIG. 19B is an experiment graph illustrating a fat acidity value among the quality changes according to the temperature change in newly harvested rice during storage, FIG. 19C is a fixed temperature/alternating temperature experiment prediction modeling graph for the turbidity, and FIG. 19D is a fixed temperature/alternating temperature experiment prediction modeling graph for the fat acidity value.

For example, in an experiment of the rice, quality is predicted through analysis of a reaction speed for a temperature change in turbidity, general bacteria, and fat acidity value as the quality parameters.

When measuring the quality index for each individual quality analysis item of the food and the total quality index based on the above method in step S708, the food quality monitoring server 120 sets an expiration date and a price of the food based on the measured quality index for each individual quality analysis item of the food and total quality index in step S709.

Further, the food quality monitoring server 120 transmits a plurality of bar code information and quality information which are matched and stored with inherent IDs of the moving sensor tags transmitted from the distribution company server 110 to the distribution company server 110 and transmits a plurality of bar code information and quality information which are matched and stored with inherent IDs of the fixed sale sensor tags to the distribution company server 110, but quality information calculated through the moving sensor tag is combined and then transmitted.

Meanwhile, the reason why the food quality monitoring server 120 transmits each of the plurality of bar code information and quality information which are matched and stored with the inherent IDs of the moving sensor tags and the plurality of bar code information and quality information which match the inherent IDs of the fixed sale sensor tags is to identify a state of change of the product information from stocking until sale.

At this time, the plurality of bar code information which is matched and stored with the inherent IDs of the moving sensor tags is bar code information attached to a plurality of food stacked in the container or palette to which the moving sensor tag 200 corresponding to the inherent ID of the moving sensor tag is attached, and the bar code information matches the inherent ID of the fixed sale sensor tag.

Further, the quality information includes a quality index for each individual quality analysis item of current food, a current total quality index, a current remainder until the expiration date, and a price.

When receiving the plurality of bar code information and the quality information from the food quality monitoring server 120, the distribution company server 110 matches the plurality of bar code information and the quality information and stores the matched information in step S711.

The food information reading device 100 is installed in a store, and reads a bar code of the product when detecting the bar code of the product within a predetermined range in step S712.

When reading the bar code, the food information reading device 100 transmits information on the read bar code to the distribution company server 110 in step S713.

When receiving the bar code information from the food information reading device 100, the distribution company server 110 identifies whether bar code information corresponding to the received bar code information is stored in step S714.

When there is the bar code information corresponding to the bar code information received from the food information reading device 100, the distribution company server 110 searches for the quality information which is matched and stored with the bar code information in step S715.

Further, the distribution company server 110 transmits the bar code information and the quality information corresponding to the bar code information to the food information reading device 100 in step S716.

The food information reading device 100 displays the bar code information and quality information received from the distribution company server 110 on a screen in step S717. Further, the food information reading device 100 can display the quality information on a receipt to provide the quality information to the consumer.

Accordingly, by reading the bar code of the food by the food information reading device 100, the user can accurately detect a current state of the food through a quality index for each individual quality analysis item according to the current state of the food and a total quality index and purchase the food based on an expiration date and price information set according to the current state of the food.

Although it has been described that the sensor tag is attached to the container or palette on which the plurality of food is stacked in the above detailed description, the sensor tag may be attached to each of the food items or attached to a package box containing the plurality of food items to sense an environmental factor value according to an environment change. Further, the present invention can be applied to blood, cosmetics, medicines, and biological medicines in the same way.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for monitoring food quality, the system comprising:
    a sensor tag, when transporting of the food starts, the sensor tag senses an environmental factor at preset time intervals, and when the sensed environmental factor value is not included in a preset environmental factor value range of the food, adjusting a time interval to sense the environmental factor, and transmits an environmental factor value sensed, a time sensing the environmental factor and product information on the food to a sensor tag reader, the sensor tag being attached to a container or palette on which food is stacked;
    a sensor tag reader for transmitting the environmental factor value sensed by the sensor tag, a time sensing the environmental factor, and product information on the food transmitted through the sensor tag to a distribution company server;

a distribution company server for transmitting the environmental factor value sensed by the sensor tag, a time sensing the environmental factor, and product information on the food transmitted through the sensor tag reader to a food quality monitoring server;

a food quality monitoring server for measuring a food quality index by using an equation including at least one of values changed per unit time in a particular temperature for at least one of the quality indexes of each food, said quality indexes including any of a reaction speed constant, a reaction degree, activation energy, a frequency constant, a temperature coefficient and a mean kinetic temperature, based on at least one of the environmental factor values sensed by the sensor tag, the time sensing the environmental factors, and the product information on the food transmitted through the distribution company server; and transmitting bar code information or electronic tag information corresponding to the food and the measured quality index to the distribution company server.

2. The system of claim 1, wherein the sensor tag senses an environmental factor, when a preset transporting hour passes, or the food arrives at a preset particular area, adjusting a time interval to sense the environmental factor.

3. The system of claim 1, wherein adjusting the time interval to sense the environmental factor is to narrow the interval to sense the environmental factor.

4. The system of claim 1, the system further comprising a food information reading device installed in a store, for transmitting bar code information or electronic tag information extracted by reading a bar code or electronic tag of the food detected within a predetermined range to the distribution company server; and receiving a quality index of the food corresponding to the bar code information or electronic tag information extracted from the distribution company server and a price linked with the quality index of the food from the distribution company server and displaying them, wherein the distribution company server identifies a quality index of the food corresponding to the received bar code information or electronic tag information, a total quality index, and a price linked with the quality index of the food based on the bar code information or electronic tag information transmitted from the food quality monitoring server, and transmits them to the food information reading device.

5. The system of claim , wherein the sensor tag does not store the sensed environmental factor value in the memory when the sensed environmental factor value is equal to a previously sensed environmental factor value and stores the sensed environmental factor and the time of sensing the environmental factor in the memory when the sensed environmental factor value is different from the previously sensed environmental factor value.

6. The system of claim 2, the system further comprising a sensor tag control terminal for determining a current position in real time through a GPS module and transmitting a signal of informing that the food arrives at a preset particular area to a sensor tag.

7. The system of claim 1, wherein the quality index of the food includes a temperature history during distribution process of a food, a quality index for each individual quality analysis item and a total quality index, wherein the quality index for each individual analysis item of the food indicates a nutritive component value for each nutritive component remaining in the food and is expressed by a percentage (%) or a numerical value, and the total quality index of the food indicates a relative value according to freshness of the food and is expressed by a percentage (%) or in a level (best, excellent, and normal).

8. The system of claim 1, wherein the food quality monitoring server sets an expiration date of the food based on the measured quality index of the food and transmits the expiration date to the distribution company server.

9. The system of claim 1, wherein the product information contains at least one of a product name of the food stacked in the container or palette, an inherent ID of the sensor tag attached to the container or palette, and initial quality information on the food.

* * * * *